United States Patent
Amini et al.

(10) Patent No.: US 10,986,626 B2
(45) Date of Patent: *Apr. 20, 2021

(54) ROBUST CONTROL PLANE FOR MANAGEMENT OF A MULTI-BAND WIRELESS NETWORKING SYSTEM

(71) Applicant: NETGEAR, INC., San Jose, CA (US)

(72) Inventors: Peiman Amini, Mountain View, CA (US); Joseph Amalan Arul Emmanuel, Cupertino, CA (US)

(73) Assignee: NETGEAR, INC., San Jose, CA (US)

( * ) Notice: Subject to any disclaimer, the term of this patent is extended or adjusted under 35 U.S.C. 154(b) by 408 days.

This patent is subject to a terminal disclaimer.

(21) Appl. No.: 15/954,411

(22) Filed: Apr. 16, 2018

(65) Prior Publication Data

US 2018/0310221 A1 Oct. 25, 2018

Related U.S. Application Data

(60) Provisional application No. 62/488,258, filed on Apr. 21, 2017.

(51) Int. Cl.
*H04W 72/04* (2009.01)
*H04W 72/12* (2009.01)
(Continued)

(52) U.S. Cl.
CPC .......... *H04W 72/0426* (2013.01); *G06F 8/65* (2013.01); *H04L 1/0004* (2013.01); *H04L 1/18* (2013.01);
(Continued)

(58) Field of Classification Search
CPC .......... H04W 72/0426; H04W 40/244; H04W 24/02; H04W 40/02; H04W 16/18;
(Continued)

(56) References Cited

U.S. PATENT DOCUMENTS 7,606,175 B1 10/2009 Maufer
7,668,128 B1 2/2010 Benveniste
(Continued)

FOREIGN PATENT DOCUMENTS

CN 1416232 A 5/2003
CN 1987798 A 6/2007
(Continued)

*Primary Examiner* — Gregory B Sefcheck
*Assistant Examiner* — Srinivasa R Reddivalam
(74) *Attorney, Agent, or Firm* — Perkins Coie LLP

(57) ABSTRACT

Systems and methods are introduced for managing a multi-band wireless networking system using a robust control plane. In an embodiment, multiple wireless networking devices are interconnected via a dedicated wireless backhaul to collectively form a single multi-band wireless network providing broad coverage to a client device. The multi-band wireless networking system is managed by wirelessly communicating control information between the multiple wireless networking devices over the control plane in a robust manner that guarantees delivery while minimizing latency. Example techniques for achieving this robust transfer of information include use of robust data rates, use of multiple backhaul channels, use of hybrid Automatic Repeat Request (ARQ), use of dedicated control channels, use of alternative transport protocols, and implementation of distributed router functionality.

37 Claims, 18 Drawing Sheets

(51) Int. Cl.
| | |
|---|---|
| *H04L 1/00* | (2006.01) |
| *H04W 40/24* | (2009.01) |
| *H04W 24/02* | (2009.01) |
| *H04L 1/18* | (2006.01) |
| *H04L 27/34* | (2006.01) |
| *H04L 29/06* | (2006.01) |
| *H04W 40/02* | (2009.01) |
| *H04W 16/18* | (2009.01) |
| *G06F 8/65* | (2018.01) |
| *H04L 9/08* | (2006.01) |
| *H04W 48/20* | (2009.01) |
| *H04W 92/20* | (2009.01) |
| *H04W 84/12* | (2009.01) |
| *H04W 4/06* | (2009.01) |
| *H04L 29/12* | (2006.01) |
| *H04L 29/08* | (2006.01) |
| *H04W 4/80* | (2018.01) |
| *H04W 84/20* | (2009.01) |
| *H04W 88/08* | (2009.01) |

(52) U.S. Cl.
CPC ............ *H04L 9/0816* (2013.01); *H04L 27/34* (2013.01); *H04L 63/14* (2013.01); *H04L 69/18* (2013.01); *H04L 69/22* (2013.01); *H04W 16/18* (2013.01); *H04W 24/02* (2013.01); *H04W 40/02* (2013.01); *H04W 40/244* (2013.01); *H04W 48/20* (2013.01); *H04W 72/1242* (2013.01); *H04L 1/0003* (2013.01); *H04L 1/188* (2013.01); *H04L 1/1812* (2013.01); *H04L 61/1511* (2013.01); *H04L 61/2015* (2013.01); *H04L 69/324* (2013.01); *H04L 69/329* (2013.01); *H04W 4/06* (2013.01); *H04W 4/80* (2018.02); *H04W 84/12* (2013.01); *H04W 84/20* (2013.01); *H04W 88/08* (2013.01); *H04W 92/20* (2013.01)

(58) Field of Classification Search
CPC ... H04W 48/20; H04W 72/1242; H04W 4/06; H04W 4/80; H04W 84/20; H04W 88/08; H04W 92/20; H04W 84/12; H04W 12/02; H04W 12/04; H04W 12/06; H04W 36/0005; H04W 40/248; H04W 56/0015; H04W 24/04; G06F 8/65; H04L 1/18; H04L 27/34; H04L 9/0816; H04L 1/0004; H04L 1/1812; H04L 1/0003; H04L 1/188; H04L 61/1511; H04L 61/2015; H04L 69/324; H04L 69/329; H04L 9/3247; H04L 9/3268; H04L 9/3278; H04L 41/082; H04L 63/08; H04L 63/0823; H04L 67/34; H04L 41/12; H04L 45/02; H04L 41/0803; H04J 3/0638
See application file for complete search history.

(56) References Cited

U.S. PATENT DOCUMENTS

| | | |
|---|---|---|
| 8,214,653 B1 | 7/2012 | Marr et al. |
| 8,259,682 B2 | 9/2012 | Dutta et al. |
| 9,525,759 B2 | 12/2016 | Zhang et al. |
| 10,133,867 B1 | 11/2018 | Brandwine et al. |
| 10,142,444 B2 | 11/2018 | Reynolds et al. |
| 10,257,868 B2 | 4/2019 | Wang et al. |
| 10,484,980 B1 | 11/2019 | Jiang et al. |
| 10,750,415 B2 | 8/2020 | Hirudayaraj et al. |
| 2001/0002486 A1 | 5/2001 | Kocher et al. |
| 2004/0117626 A1 | 6/2004 | Andreasyan |
| 2004/0218683 A1 | 11/2004 | Batra et al. |
| 2005/0233693 A1 | 10/2005 | Karaoguz et al. |
| 2007/0064609 A1* | 3/2007 | Igarashi ............ H04L 47/2408 370/230 |
| 2008/0065816 A1 | 3/2008 | Seo |
| 2008/0076392 A1 | 3/2008 | Khetawat et al. |
| 2008/0076393 A1 | 3/2008 | Khetawat et al. |
| 2008/0076412 A1 | 3/2008 | Khetawat et al. |
| 2008/0080414 A1 | 4/2008 | Thubert et al. |
| 2009/0165086 A1 | 6/2009 | Trichina et al. |
| 2009/0214036 A1 | 8/2009 | Shen et al. |
| 2009/0320110 A1 | 12/2009 | Nicolson et al. |
| 2010/0135201 A1 | 6/2010 | Lewis et al. |
| 2010/0182959 A1 | 7/2010 | Cook et al. |
| 2010/0190457 A1* | 7/2010 | Tu .................. H04B 17/336 455/115.4 |
| 2011/0010543 A1 | 1/2011 | Schmidt et al. |
| 2011/0041003 A1 | 2/2011 | Pattar et al. |
| 2011/0087887 A1 | 4/2011 | Schmidt et al. |
| 2011/0173457 A1 | 7/2011 | Reh |
| 2012/0005369 A1 | 1/2012 | Capone et al. |
| 2012/0005480 A1 | 1/2012 | Batke et al. |
| 2013/0185563 A1 | 7/2013 | Djabarov et al. |
| 2013/0198838 A1 | 8/2013 | Schmidt et al. |
| 2013/0268689 A1 | 10/2013 | Leucht-Roth |
| 2014/0006787 A1 | 1/2014 | Measson et al. |
| 2014/0119303 A1 | 5/2014 | Kwon et al. |
| 2014/0123124 A1 | 5/2014 | Gray et al. |
| 2014/0192785 A1 | 7/2014 | Gong |
| 2015/0071307 A1* | 3/2015 | De Smet ............ H04L 65/602 370/477 |
| 2015/0245182 A1 | 8/2015 | Scagnol et al. |
| 2015/0261521 A1 | 9/2015 | Choi et al. |
| 2015/0271017 A1 | 9/2015 | Seligson et al. |
| 2015/0363576 A1 | 12/2015 | Medvinsky et al. |
| 2015/0382328 A1* | 12/2015 | Jiang ............... H04L 1/001 370/329 |
| 2016/0029356 A1 | 1/2016 | Bhanage et al. |
| 2016/0036814 A1 | 2/2016 | Conrad et al. |
| 2016/0036956 A1 | 2/2016 | Debates et al. |
| 2016/0119052 A1 | 4/2016 | Frerking et al. |
| 2016/0198350 A1 | 7/2016 | Lou et al. |
| 2016/0212745 A1 | 7/2016 | Hiertz et al. |
| 2016/0227440 A1 | 8/2016 | Forssell et al. |
| 2016/0262160 A1* | 9/2016 | Mo ................. H04L 41/50 |
| 2016/0262163 A1 | 9/2016 | Gonzalez Garrido et al. |
| 2016/0280370 A1 | 9/2016 | Canavor et al. |
| 2016/0294829 A1 | 10/2016 | Angus |
| 2016/0301566 A1* | 10/2016 | Ramasubramani ... H04L 41/022 |
| 2016/0366229 A1 | 12/2016 | Yamaura et al. |
| 2017/0026966 A1 | 1/2017 | Gao et al. |
| 2017/0086152 A1* | 3/2017 | Li .................. H04W 72/0446 |
| 2017/0090909 A1 | 3/2017 | Guo et al. |
| 2017/0093645 A1 | 3/2017 | Zhong et al. |
| 2017/0093800 A1 | 3/2017 | Wiseman et al. |
| 2017/0104580 A1 | 4/2017 | Wooten et al. |
| 2017/0118198 A1 | 4/2017 | Cuff et al. |
| 2017/0126411 A1 | 5/2017 | Piqueras et al. |
| 2017/0187537 A1 | 6/2017 | Kim et al. |
| 2017/0195459 A1 | 7/2017 | E Costa et al. |
| 2017/0201499 A1 | 7/2017 | McLaughlin et al. |
| 2017/0208418 A1 | 7/2017 | Conan et al. |
| 2017/0249135 A1 | 8/2017 | Gandhi et al. |
| 2017/0265066 A1 | 9/2017 | Vyas |
| 2017/0310655 A1 | 10/2017 | Sethi et al. |
| 2017/0331670 A1 | 11/2017 | Parkvall et al. |
| 2017/0359190 A1 | 12/2017 | Nadathur et al. |
| 2018/0054492 A1 | 2/2018 | Kim et al. |
| 2018/0091315 A1 | 3/2018 | Singhal et al. |
| 2018/0098263 A1* | 4/2018 | Luo ................. H04L 1/1628 |
| 2018/0183603 A1 | 6/2018 | Liu et al. |
| 2018/0183723 A1* | 6/2018 | Cariou ............. H04L 12/4633 |
| 2018/0196945 A1 | 7/2018 | Kornegay et al. |
| 2018/0239897 A1 | 8/2018 | Ventura |

(56) References Cited

U.S. PATENT DOCUMENTS

2018/0278625 A1  9/2018  Cammarota et al.
2018/0278697 A1* 9/2018  Cariou .................. H04L 1/0028

FOREIGN PATENT DOCUMENTS

| | | | |
|---|---|---|---|
| CN | 101442402 | A | 5/2009 |
| CN | 102291794 | A | 12/2011 |
| CN | 103067095 | A | 4/2013 |
| CN | 103167631 | A | 6/2013 |
| CN | 103460666 | A | 12/2013 |
| CN | 103648109 | A | 3/2014 |
| CN | 104796355 | A | 7/2015 |
| CN | 104955102 | A | 9/2015 |
| CN | 105050081 | A | 11/2015 |
| CN | 106102074 | A | 11/2016 |
| CN | 106575324 | A | 4/2017 |
| CN | 107864490 | A | 3/2018 |
| WO | 2016162763 | A1 | 10/2016 |

* cited by examiner

ROBUST CONTROL PLANE FOR MANAGEMENT OF A MULTI-BAND WIRELESS NETWORKING SYSTEM

CROSS-REFERENCE TO RELATED APPLICATION(S)

This application claims priority to U.S. Provisional Patent Application No. 62/488,258 filed on Apr. 21, 2017, and entitled "INTELLIGENT MULTI-AP MANAGEMENT SYSTEM," which is hereby incorporated by reference in its entirety.

TECHNICAL FIELD

Various of the disclosed embodiments concern communications networks involving multiple wireless access points (WAPs or APs). More specifically, embodiments of the invention concern an intelligent multi-AP management system.

BACKGROUND

Networking systems including multiple wireless APs are a relatively recent innovation. While such networking systems provide several benefits such as enabling broader wireless coverage, they also present certain challenges related to reliability and practicality. For example, effectively operating wireless networking systems including multiple APs often involves the exchange of control information between the APs. However, conventional solutions cannot guarantee delivery of this control information, nor can conventional solutions deliver such information without causing unworkable delays due to latency. As such, deployment of control functionality in current systems often results in disruption of client services.

SUMMARY

Embodiments of the invention are described in the context of a multi-band (e.g., tri-band) wireless networking system. In some embodiments, the multi-band wireless networking system includes multiple wireless networking devices that are interconnected via a dedicated wireless communication channel or "backhaul." At least one of the wireless networking devices is connected to the Internet and serves as a router. The multi-band wireless network formed by the multiple wireless networking devices provides broad wireless coverage to client devices.

Techniques are introduced for establishing a robust control plane over which to wirelessly communicate control information between the multiple wireless networking devices of a multi-band wireless networking system. The robust control plane can be implemented by a software entity running above layers 1 and 2. In some embodiments, protocols for communicating control information over the robust control plane are established to guarantee delivery while minimizing latency. For example, in some embodiments, established protocols for communicating control information may include any of the use of robust data rates, use of multiple backhaul channels, use of hybrid Automatic Repeat Request (ARQ), use of dedicated control channels, use of alternative transport protocols, and implementation of distributed router functionality.

Other aspects of the disclosed embodiments will be apparent from the accompanying figures and detailed description. This Summary is provided to introduce a selection of concepts in a simplified form that is further explained in the Detailed Description. This Summary is not intended to identify key features or essential features of the claimed subject matter, nor is it intended to be used to limit the scope of the claimed subject matter.

DETAILED DESCRIPTION

1.0 Wireless Networking System

Embodiments of the invention are described in the context of a wireless networking system, specifically a multi-band wireless networking system. In some embodiments, the multi-band wireless networking system includes multiple wireless networking devices also referred to herein as nodes. At least one of the wireless networking devices is connected to the Internet and serves as a router. The remaining wireless networking devices serve as satellites that are wirelessly connected to the router via a wireless channel (i.e., a band), which is dedicated to the communications between the wireless networking devices (i.e., a dedicated backhaul). Both the router and the satellites provide wireless network connections (e.g., Wi-Fi connections) to client devices, such as desktop computers, laptop computers, tablet computers, mobile phones, wearable smart devices, game consoles, smart home devices, etc. The router and the satellites together provide a single wireless network having broad coverage to the client devices. The multi-band wireless networking system dynamically optimizes the wireless connections of the client devices without the need of reconnecting. An example of the multi-band wireless networking system is the NETGEAR® Orbi® system. Such systems are exemplified in U.S. patent application Ser. No. 15/287,711, filed Oct. 6, 2016, and Ser. No. 15/271,912, filed Sep. 21, 2016, both of which are hereby incorporated by reference in their entireties for all purposes.

The wireless networking devices of a multi-band wireless networking system can include radio components for multiple wireless bands, such as 2.5 GHz band, 5 GHz low band, and 5 GHz high band. In some embodiments, at least one of the bands can be dedicated to the wireless communications among the wireless networking devices of the system. Such wireless communications among the wireless networking devices of the system are referred to herein as "backhaul" communications. Any other bands can be used for wireless communications between the wireless networking devices of the system and client devices connecting to the system. The wireless communications between the wireless networking devices of the system and client devices are referred to herein as "fronthaul" communications.

Figure 1:
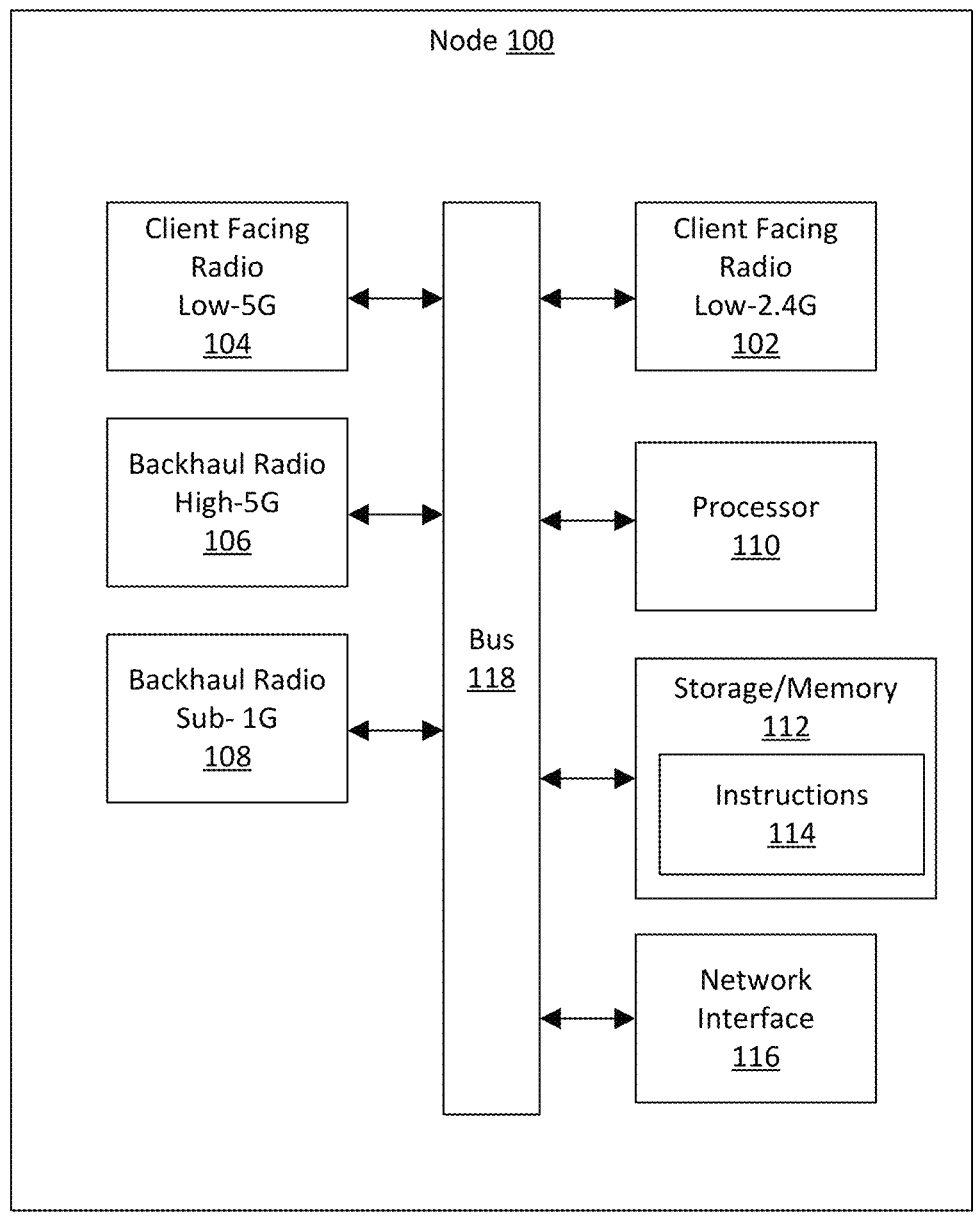
FIG. 1 shows a diagram of an example node in the form of a wireless AP.

FIG. 1 is a block diagram of an example node 100 of a multi-band wireless networking system. The term "node" in this context may refer to any type of wireless networking device configured for the transmission and/or reception of wireless communication signals. For example, nodes may include wireless APs, Bluetooth devices, signal repeaters, signal monitors, etc. In some embodiments, the example node 100 includes radio components for a number of wireless bands, such as a 2.4 GHz band radio 102, a 5 GHz low band radio 104, a 5 GHz high band radio 106, and a sub-1 GHz radio 108. The node 100 also includes a processor 210 for executing program logic and a digital storage or memory 112 including instructions 114 to be executed by the processor 110. The example node may also include a network interface 116 for connecting to a wired network and providing overall access to the Internet to the system, though generally only a base unit (i.e., router node) is actually connected to the Internet. The various components of example node 100 are communicatively coupled via a bus 118. The node 100 depicted in FIG. 1 is an example provided for illustrative purposes. Other nodes may include fewer or more components than are shown in FIG. 1. Additional details regarding some of the components of example node 100 are described with the respect to the example processing system 1200 in FIG. 12.

Figure 2:
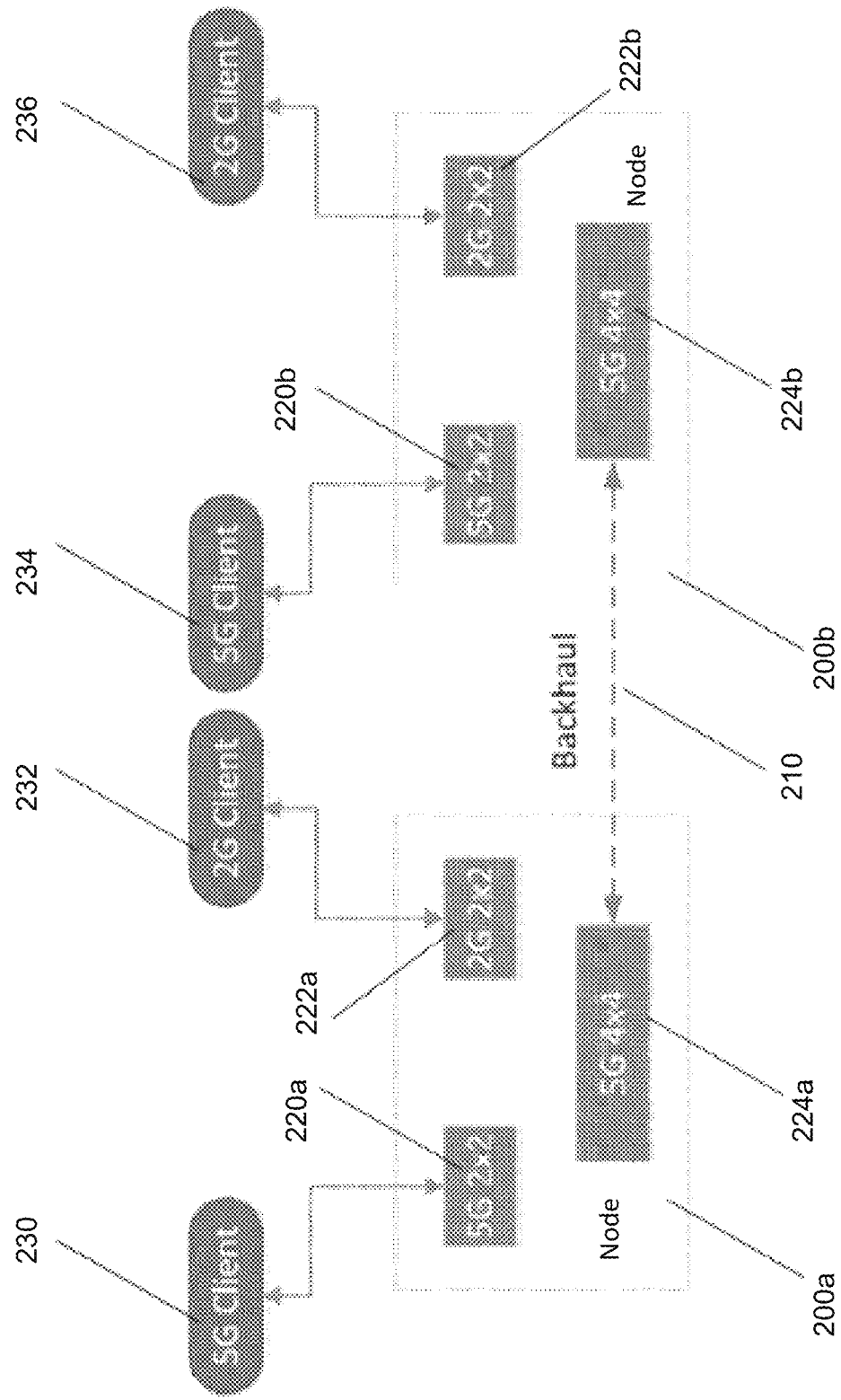
FIG. 2 shows a schematic diagram of an example wireless backhaul established between two nodes in a multi-band wireless networking system.

FIG. 2 is a block diagram showing a backhaul link established between two nodes in a multi-band wireless networking system. Each of the two nodes depicted in FIG. 2 may be the same or similar to the example node 100 depicted in FIG. 1. In some embodiments, a multi-band wireless networking system may be implemented as a mesh network with multiple nodes comprising mesh points in the mesh network. However, those skilled in the art will appreciate that the technique described herein can be readily implemented in other types of network configurations such as ring, star, etc. In FIG. 2, the two nodes 200*a* and 200*b* each include multiple radios 220*a*, 222*a*, 224*a* and 220*b*, 222*b*, 224*b*, respectively. As shown in FIG. 2, the multiple radios can include radios operating on a 2.5 GHz band, a 5 GHz low band, and a 5 GHz high band. The nodes 200*a* and 200*b* use some of the radios to communicate with various clients 230, 232, 234, and 236. In some embodiments, at least one radio at each node is used to establish a dedicated backhaul 210 between the nodes. Those skilled in the art will appreciate that the number of nodes and radios per node can vary depending on the implementation. For example, although not shown in FIG. 2, the nodes 200*a* and 200*b* may also include sub-1 GHz radios (e.g., as shown in FIG. 1) that may be used to establish an additional dedicated backhaul between nodes.

As mentioned above, a sub-1 GHz radio and a 5 GHz high band radio may be dedicated to the wireless communications among nodes in a multi-band wireless networking system. The wireless communications among the nodes of a multi-band wireless networking system are called backhaul communications. In general, backhaul communications can refer to two different types of communications: control communications (also referred to as "management" and/or "coordination" communications) critical to the functioning of a multi-band wireless network, and communications propagating the data passed throughout the network (e.g., data packet forwarding to and from a gateway and the Internet). The latter of these communications is much more bandwidth intensive. This is because these communications include all the files, streaming content, video game data, and other large communications downloaded and uploaded across a given network. For the purposes of this disclosure, the communications propagating the data passed throughout the network will continue to be referred as "backhaul communications." Conversely the control communications originating at nodes in the wireless networking systems and/or destined for other nodes in the wireless networking system (including any communications for management, coordination, configuration, etc.) will be referred to as "control communications."

The other bands (e.g., 2.4 GHz and 5 GHz low band) may be available for use for wireless communications between the nodes (e.g., nodes 200*a* and 200*b*) of a multi-band wireless networking system and with client devices (e.g., 230, 232, 234, and 236). Client devices may communicate over several protocols. The wireless communications between the nodes of the multi-band wireless networking system and client devices are called fronthaul communications. The radios over which such communications are transmitted and received are also referred to as "client facing."

In some embodiments, 2.4 GHz band radios and 5 GHz low band radios are used for fronthaul communications. For example, when the 2.4 GHz band is used for fronthaul communications, each node serving as an AP in a multi-band wireless networking system can operate on a different channel in the 2.4 GHz band. The decision for a best channel for each node serving as an AP can be made based on various factors, such as network topology, number of interfering APs on each channel for each unit, noise on each channel for each unit, interference duration as percentage of time for each unit, type of network traffic supported for each node, etc.

If a backhaul channel (e.g., a channel in the 5 GHz high band) goes down, the 2.4 GHz band can be used as a backup for backhaul and/or control communications among units of the system. For example, if a node 100 operating in satellite mode detects that the backhaul channel in the 5 GHz high band is no longer available (e.g., due to strong interference), the node's 2.4 GHz radio component can switch to a scan mode to look for an uplink connection at one of the 2.4 GHz channels with another node operating in router mode.

If there are multiple clean channels available for a node, the node selects a clean channel that interferes less with other units that are in vicinity. A client channel is defined based on a function of interference, number of nodes, and/or other parameters. If the function for a channel is less than a threshold, the channel is a clean channel. There are various ways to detect units in vicinity. For example, one method uses networking topology among the nodes to detect nodes in vicinity. Beacon power from other nodes is used to detect nodes in vicinity. In some embodiments, a node uses a combination of networking topology and beacon power to detect other nodes of the system in vicinity.

The nodes serving as APs in multi-band wireless networking system communicate the fronthaul channel selections with other nodes through the dedicated backhaul. In some embodiments, nodes having higher-priority network traffic have a higher priority in picking the fronthaul channel over other nodes.

The nodes of a multi-band wireless networking system make decisions regarding fronthaul channel selections in either a centralized way or a distributed way. In a distributed way, each node decides on channel selection for itself. For example, in some embodiments, a router node selects a fronthaul channel first. Then, each satellite node selects a fronthaul channel after the router node establishes a backhaul link with the satellite nodes. The system can optimize the channel selection based on some regular schedule. In some embodiments, nodes handling higher-priority network traffic have a higher priority in picking the fronthaul channel over other nodes during system boot-up or during scheduled channel optimization.

In a centralized way, a router node makes decisions of channel selections for all other satellite nodes of the system. This may be communicated through control communications over the dedicated backhaul. Each satellite node establishes a dedicated backhaul link with the router node or an intermediate satellite node and scans the channels in the fronthaul band(s). Each satellite node sends detailed information regarding candidates of fronthaul channels to the router node through control communications via the dedicated backhaul. The detailed information can include, for example, scan results on all channels in the fronthaul band(s) and interference on all channels in the fronthaul band(s). The router node then makes the centralized decision on channel selection periodically over time among other control communications.

2.0 Robust Control Plane

A wireless networking system involving multiple wirelessly interconnected nodes can depend on control and management exchanges that are critical for the network to function. Such exchanges may occur, for example, when new nodes are added or existing nodes are removed, when the topology of the network changes, when credentials (e.g., keys, passwords, certificates) are exchanged between nodes for security purposes, and when client devices are handed off between nodes.

Figure 3:
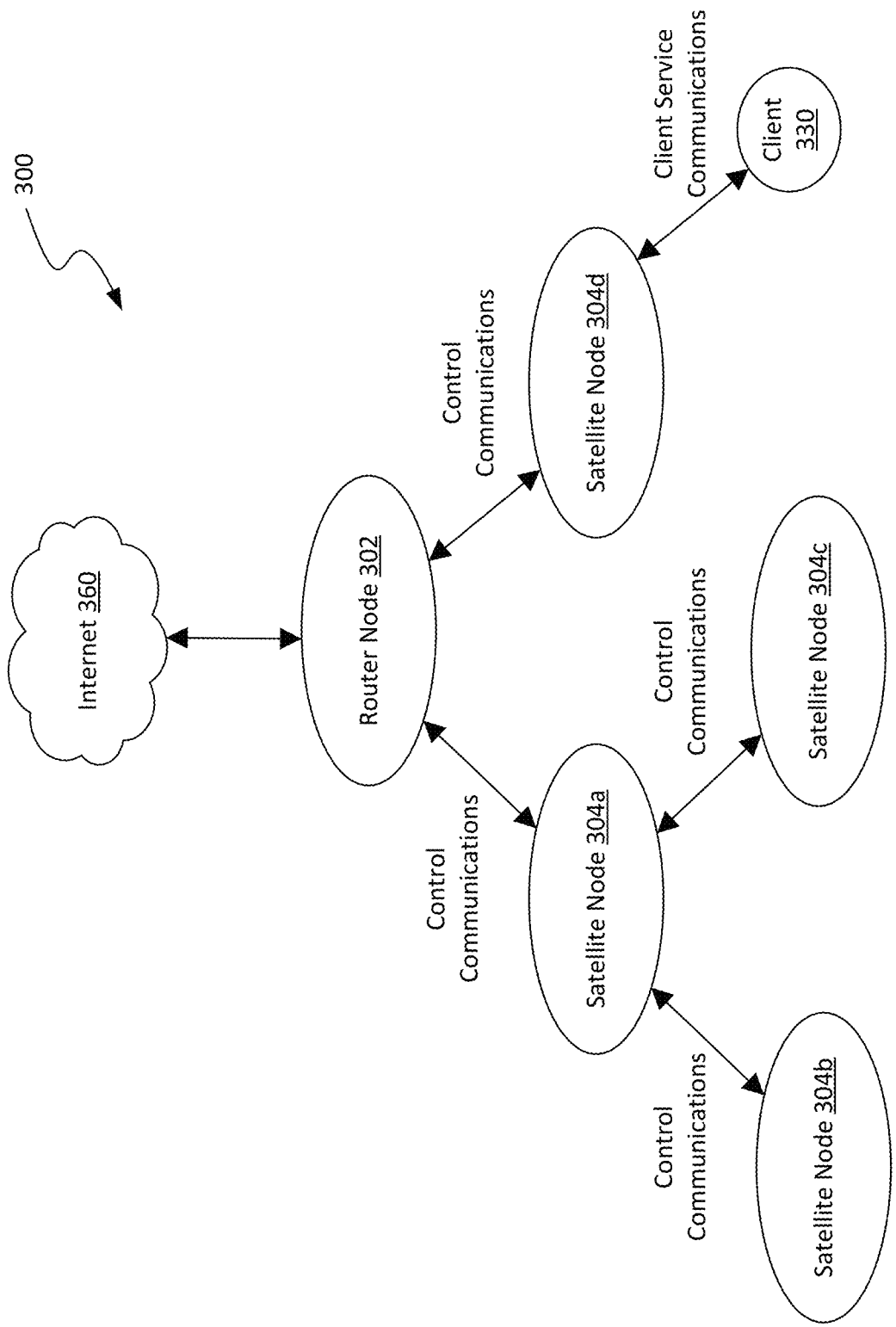
FIG. 3 shows schematic diagram of an example multi-band wireless networking system providing broad wireless coverage to a client device.

FIG. 3 shows a diagram of an example wireless network 300 including a router node 302 and multiple satellite nodes 304*a*, 304*b*, 304*c*, and 304*d*. As previously discussed, the router node 302 provides overall access to the Internet 360. The multiple nodes 302 and 304*a*-*d* serving as APs collectively provide broad wireless coverage to a client device 330. The control communications between nodes are critical to the functioning of such a system. Delays and interruptions of such control communications due to packet loss, for example, can significantly impact the overall quality of service provided to clients. For example, in certain embodiments, to provide coverage to client 330, the router node 302 (which is providing the overall connection to the Internet 360) receives updating information from the satellite nodes 304*a*-*d* regarding a connecting client 330. This information can include, for example, which satellite node the client 330 is connected to and which IP has been assigned to the client 330. If this updating information is not communicated accurately and in a timely fashion, the system 300 lags and the client 330 may lose connectivity.

Quickly and effectively communicating information between nodes without error can present a challenge even in systems that include wired communication links between the multiple nodes. This challenge is further amplified where the multiple nodes are instead wirelessly interconnected. A multi-band wireless networking system, for example as described with respect to FIG. 2, may use a backhaul communication channel (e.g., using 5 GHz high band radios) to exchange control communications between nodes which can be prone to packet loss due to outage or collision. For example, 802.11 Wi-Fi standards include protocols intended to maximize throughput with an expectation that some latency due to packet loss may occur. This may work for the majority of backhaul communications (i.e., packets forwarded between clients and the Internet) transferring over the backhaul communication link, but may not be effective for control communications for the reasons stated above.

Figure 4:
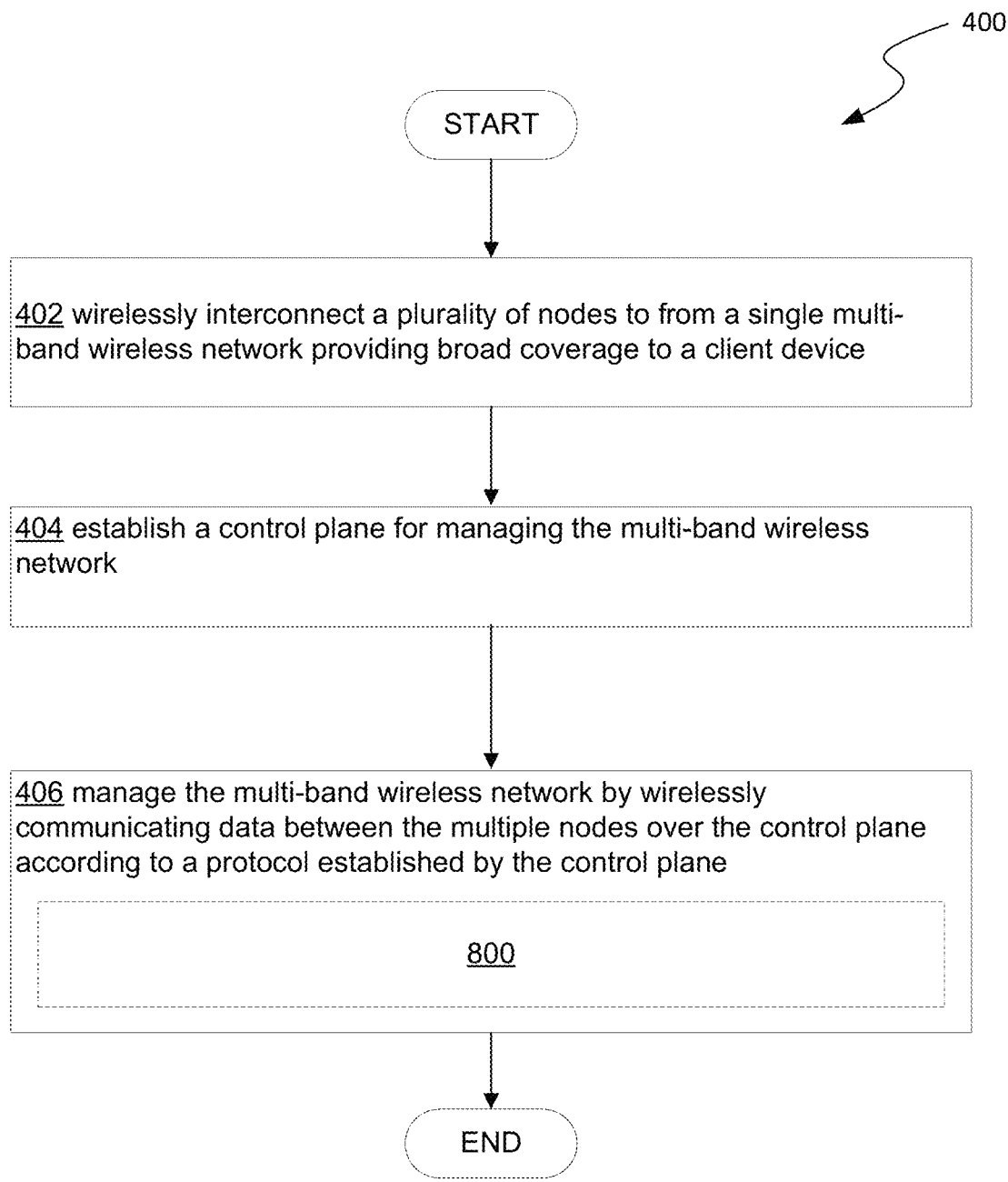
FIG. 4 shows a flow diagram of an example process for managing a multi-band wireless networking system using a robust control plane.

To address the challenges described above, techniques are introduced for establishing a robust control plane in a multi-band wireless networking system over which control signals can be prioritized and communicated between nodes (e.g., over a backhaul channel) in a manner that minimizes packet loss. FIG. 4 is a flow chart of an example process 400 for managing a multi-band wireless networking system using a robust control plane. As shown in FIG. 4 example process 400 begins at step 402 with wirelessly interconnecting multiple nodes (e.g., wireless networking devices) to form a single multi-band wireless network configured to provide broad coverage to a client device. As described with respect to FIG. 3, the multiple nodes may include a router or 'base' node 302 that provides connectivity to an external network such as the Internet, and one or more satellite nodes 304*a*-*d*. The multiple nodes of the multi-band wireless network may be interconnected via one or more dedicated wireless communication channels, for example, in the form of a backhaul (as previously described).

The example process 400 continues at step 404 with establishing a control plane for managing the multi-band wireless network. A control plane can be generally defined as the portion of the multi-band wireless network over which control communications between the multiple nodes are carried. The control plane can be conceptually differentiated with a data plane (also referred to as a forwarding plane) which carries the traffic that a given network is designed to carry (e.g., traffic to and from client devices). Note that some implementations further distinguish a management plane tasked with, for example, device monitoring; however, for the purposes of this disclosure, the term "control plane" shall be understood to encompass elements sometimes referred to as belonging to a management plane.

Figure 12:
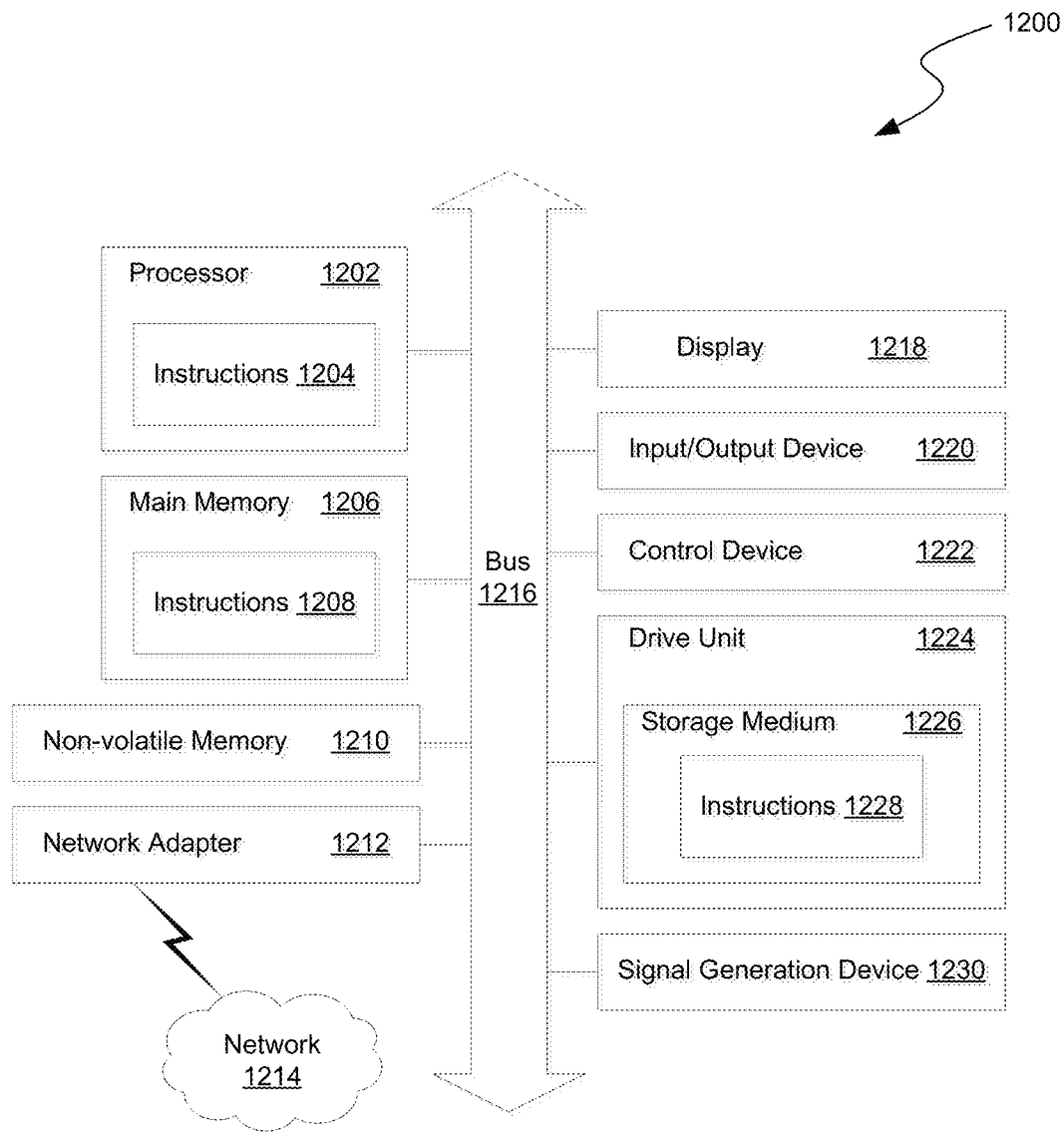
FIG. 12 shows a diagram of an example of a processing system in which at least some operations described in this disclosure can be implemented.

One or more steps of the example process 400 may be performed by any one or more of the components of the example processing systems described with respect to FIG. 1 or 12. For example, the process depicted in FIG. 4 may be represented in instructions stored in memory that are then executed by a processing unit. The process 400 described with respect to FIG. 4 is an example provided for illustrative purposes and is not to be construed as limiting. Other processes may include more or fewer steps than depicted while remaining within the scope of the present disclosure. Further, the steps depicted in example process 400 may be performed in a different order than is shown.

Figure 5:
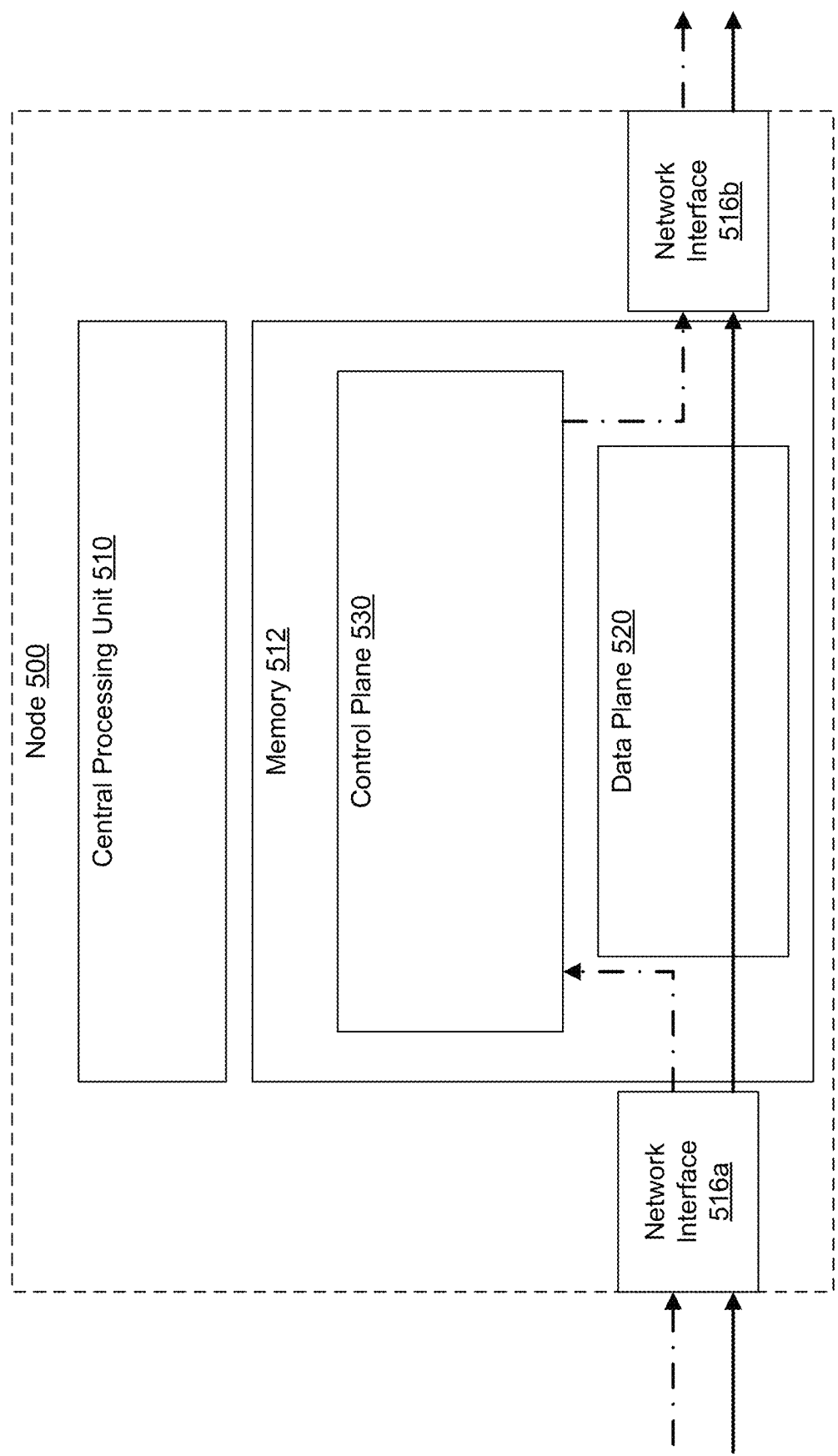
FIG. 5 shows a schematic diagram illustrating an implementation of a robust control plane at a node in a multi-band wireless networking system.

FIG. 5 shows a diagram that illustrates an example implementation of a control plane at an example node 500 in a multi-band wireless network (e.g., similar to example node 100 described with respect to FIG. 1). Typically, most of the data routing through the node 500 (e.g., from a client device to an external network or between nodes) comprises fronthaul or backhaul traffic (as indicated by the solid line arrows) and is processed and forwarded by a data plane 520. Conversely, some of the traffic between nodes (e.g., control communications for managing and maintaining the operation of the multi-band wireless networking system) (as indicated by the broken line arrows) is processed and routed over the control plane 530. The control plane traffic may include, for example, control plane packets originating from other nodes and received at node 500 and/or control plane packets generated at the node 500 for transmission to other nodes in the multi-band wireless networking system. Control plane traffic may include, for example, routing protocol traffic (e.g., OSPF, EIGRP or BGP, etc.), system configuration/management traffic, topology update traffic, etc.

In some embodiments, the planes of operation (i.e., control plane 530 and data plane 520) involve processes executed by a shared CPU 510 (e.g., similar to processor 110 described with respect to FIG. 1) using the shared resources of memory 512 (e.g., similar to memory 112 described with respect to FIG. 1). For example, as described below with regard to FIGS. 6A-6B, the control plane may be implemented in software which runs above layer 1 and layer 2. Both control plane traffic and data plane traffic may be received at and transmitted by the shared network interface 516a-b at node 500 (e.g., similar to network interface 116 descried with respect to FIG. 1).

To achieve the robust data transmission characteristics needed to effectively manage a multi-band wireless network, control communications transmitted between nodes over the control plane may be treated differently than standard backhaul communications carrying traffic to and from client devices. For example, consider again 802.11 Wi-Fi that includes protocols intended to maximize throughput with an expectation that some latency due to packet loss may occur. Accordingly, control communications intended to be transferred via a robust control plane may include indicators that allow the system to recognize the special status of communications and transmit according to protocols established for the control plane. In an illustrative embodiment, management software running above layer 2 at a particular node may generate control signals in the form of control plane packets for transmission to another node via a dedicated wireless channel (e.g., a backhaul). The generated control plane packets may include a marker of some type that allows lower level components (e.g., PHY hardware) to recognize the packets as control plane packets and transmit according to the protocols established for the control plane.

As previously discussed, the protocols established by the control plane for a multi-band wireless network may be configured for robust transfer of control data (i.e., low packet loss). For example, data transmitted over the control plane can be transmitted at robust data rates, over multiple backhauls, using hybrid ARQ, using dedicated radios configured for robust data transmission, etc. Example protocols for the robust transmission of data over a control plane are described in more detail below.

Figure 6A:
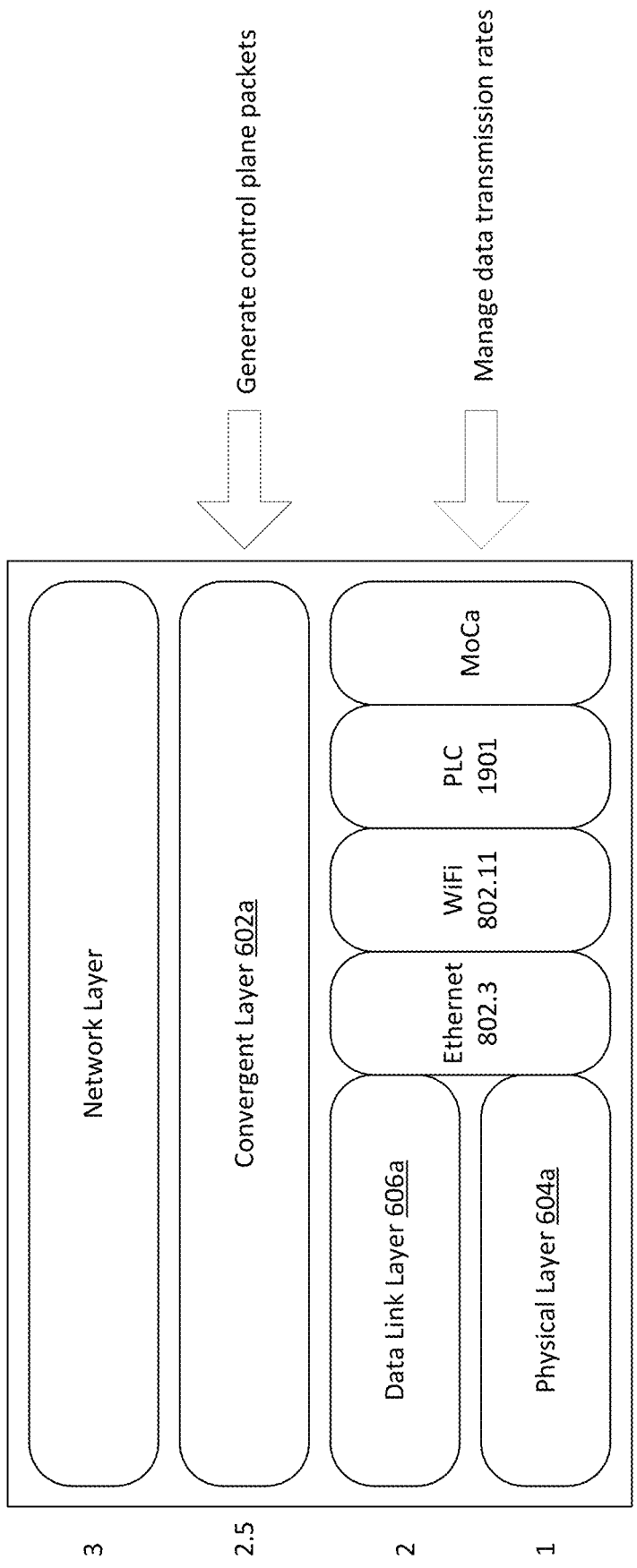
FIG. 6A shows a schematic diagram illustrating an implementation of a robust control plane in the context of a layer stack according to the Open Systems Interconnect (OSI) architecture model.
Figure 6B:
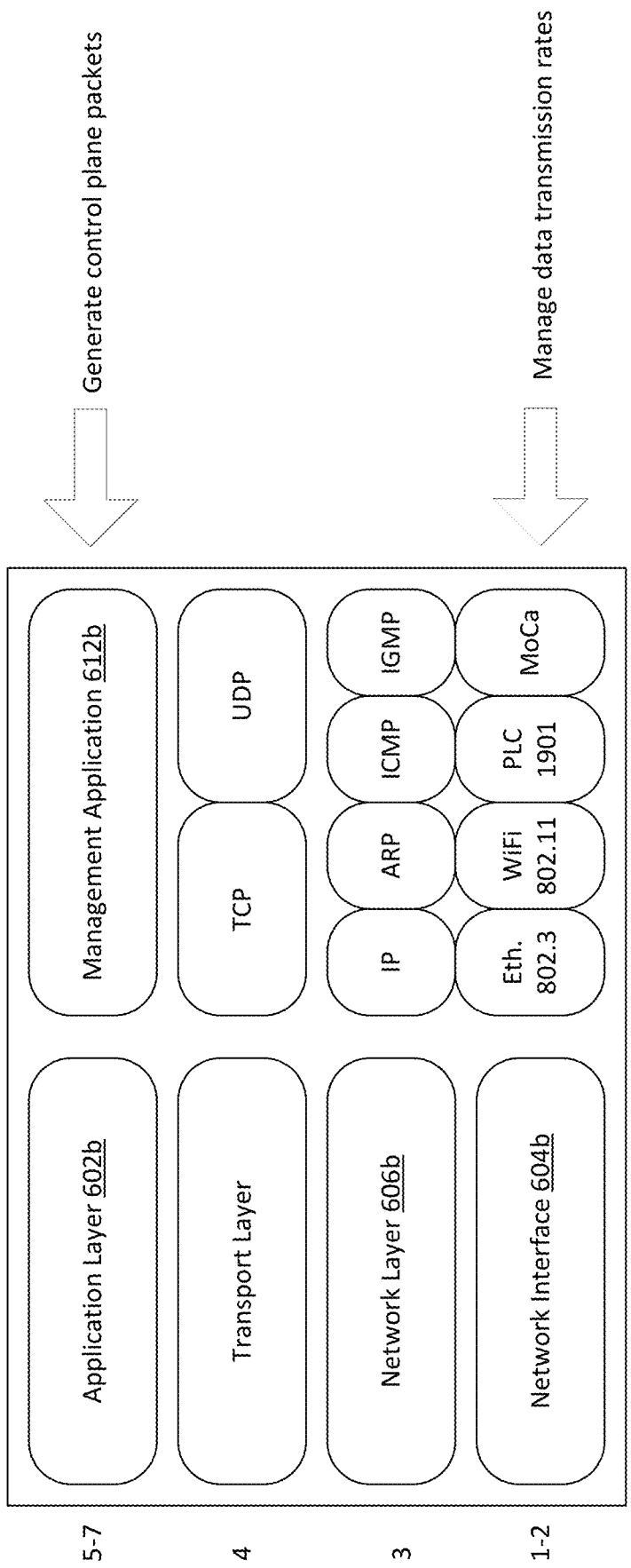
FIG. 6B shows a schematic diagram illustrating an implementation of a robust control plane in an application layer of a layer stack according to the TCP/IP architecture model.

In some embodiments, the control plane can be implemented in firmware at one or more of the nodes forming the multi-band wireless network. Alternatively, or in addition, the control plane can be implemented in software. For example, a control plane, in accordance with the present teachings, can be implemented in and managed by software which runs above layer 1 and layer 2. For example, FIG. 6A shows an example layer stack according to the OSI model in which the control plane is implemented, at least in part, by a software entity running in a convergent layer 602a that is above the physical layer 604a and data link layer 606a. As an illustrative example, devices and systems that conform with the IEEE 1905.1 home network standard operate in a similar convergent layer. As shown in FIG. 6A, in some embodiments, control communications (e.g., in the form of control plane packets) are generated by the software entity running in the convergent layer 602a, while the execution of protocols (e.g., robust data rates) to transmit the generated packets is managed at lower levels (e.g., the physical layer 604a and/or data link layer 606a). FIG. 6B illustrates this concept in the context of a layer stack according to the TCP/IP model in which the control plane is implemented, at least in part, by a software entity in the form of a user management application 612b running in the application layer 602b. As shown in FIG. 6B, control communications (e.g., in the form of control plane packets) are generated by the management application 612b running in the application layer 602b, while the execution of protocols (e.g., robust data rates) to transmit the generated packets is managed at lower levels (e.g., the network interface layer 604b and/or network layer 606b). A person having ordinary skill will recognize that FIGS. 6A and 6B provide illustrative examples of how a robust control plane may be implemented in the context of a network architecture, but are not to be construed as limiting. Other embodiments may implement a robust control plane using an alternative arrangement.

Returning to FIG. 4, the example process 400 continues at step 406 with managing the multi-band wireless network by wirelessly communicating data between the multiple nodes over the control plane according to the one or more protocols established by the control plane.

One aspect of implementing a robust control plane may include identifying control plane data generated at higher levels (e.g., at a management application) for prioritized transmission at lower levels (e.g., PHY or MAC) according to one or more protocols established for the control plane (e.g., robust data rates, multiple backhauls, etc.). For example, a standard packet falling under the IEEE 1905.1 standard may be placed into a best effort queue for transmission to other devices. The best effort queue may be one of several queues implemented by a chipset at a given wireless networking device. If, a control plane packet is intended to be transmitted in a prioritized manner (e.g., through a best effort queue) the control plane packet can be marked to be recognized as a control plane packet by lower level components. In some embodiments, control plane packets may be marked to, in effect, spoof lower level components (e.g., a processor at a wireless networking device) into treating the packets similar to other prioritized traffic. For example, depending on the configuration of lower level components, a control plane packet generated by a management application may be marked as a Wi-Fi beacon, a 1905.1 packet, a video packet, etc. to be handled in a prioritized manner by lower level components.

Figure 7A:
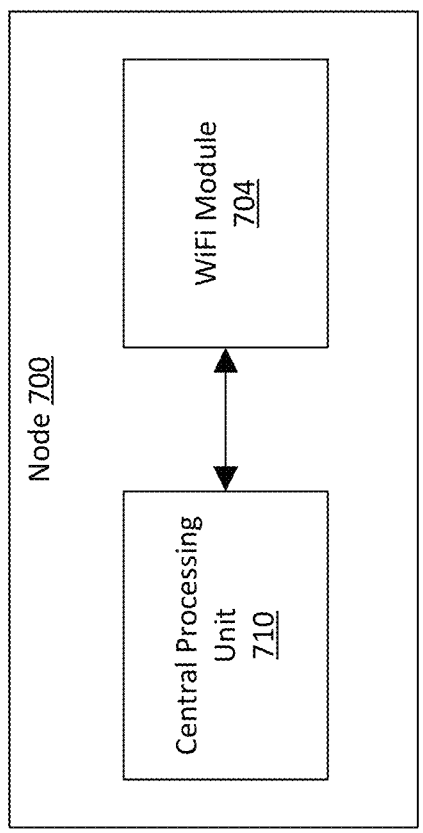
FIG. 7A shows a diagram illustrating communication between internal components at an example node.

In some embodiments, a marker indicative of a status of a control plane packet may be included in the packet as any of a header appended to the control plane packet, a modification of an existing header of the control plane packet, and/or as information in a payload of the control plane packet. Consider, for example, FIG. 7A, which shows a diagram illustrating communication between internal components at an example node 700 (e.g., similar to node 100 described with respect to FIG. 1) in the form of a Wi-Fi AP. In some embodiments, the protocols for transmitting a given packet are executed at the hardware level by a processing unit such as central processing unit (CPU) 710 (e.g., similar to the processor 110 described with respect to FIG. 1). The CPU 710 is communicatively coupled, for example, to a Wi-Fi module 704 which may include or be coupled to a radio (e.g., any of a 2.4 GHz radio 102, a 5 GHz low band radio 104, a 5 GHz high band radio 106, or sub 1-GHz radio 108) for wirelessly transmitting the data of the packet. As previously described with respect to FIG. 1, the CPU 702 may be communicatively coupled to the Wi-Fi module 704 via some type of internal bus 118 (e.g., PCIe).

In some embodiments, priority status of control plane packets can be mapped to Wireless Multi-Media (WMM) of the 802.11 standard where control plane packets are transmitted over a WLAN using Wi-Fi. WMM prioritizes traffic according to several access categories, namely voice, video, best effort, and background. WMM prioritizes voice and video over traffic from other applications that are less time critical. Accordingly, control plane packets can be marked as voice or video in order to prioritize the transmission of the control plane packets using WMM. In other words, using WMM may ensure that control plane packets marked as voice or video are inserted into higher priority queues and sent quicker than other packets.

Figure 7B:
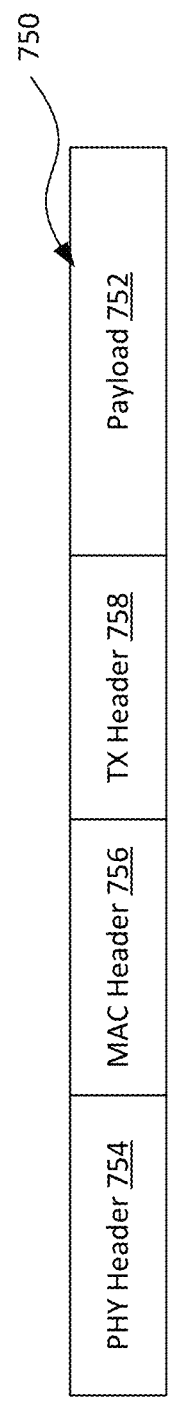
FIG. 7B shows a representation of an example control plane frame.

When a control plane packet is generated and sent by node 700, protocols associated with the transmission of that packet may be executed at the CPU 710 with core communication functions of the MAC and PHY layer performed by the Wi-Fi module 704. A software entity (e.g., a management application executing at node 700) can compose the generated packet to be recognizable for prioritized transmission by lower level components. For example, FIG. 7B shows an arrangement of an example frame 750 that may include a generated control plane packet. The control plane packet may comprise at least part of the payload portion 752 of the example frame 750. As shown in FIG. 7B, the example frame may include a set of one or more headers such as a physical layer (PHY) header 754, a data link layer (MAC) header 756, and a transport layer (TX) header 758. Although not shown in FIG. 7B, drivers at the node 700 (e.g., associated with the CPU 701 and/or Wi-Fi module 704) may include their own associated headers designed for software at the CPU 710 to adjust operating parameters (e.g., data rate) by the Wi-Fi module 704 for a given packet which instruct a radio what to do with the packet.

In any case, as previously described, a control plane packet (e.g., generated by a software entity running above layer 2) may include a marker indicative of its status as a control plane packet. In the context of the example frame 750 shown in FIG. 7B, the control plane packet may be marked by appending and/or modifying any of a physical layer (PHY) header 754, a data link layer (MAC) header 756, or a transport layer (TX) header 758, or by modifying the payload 752.

Figure 8:
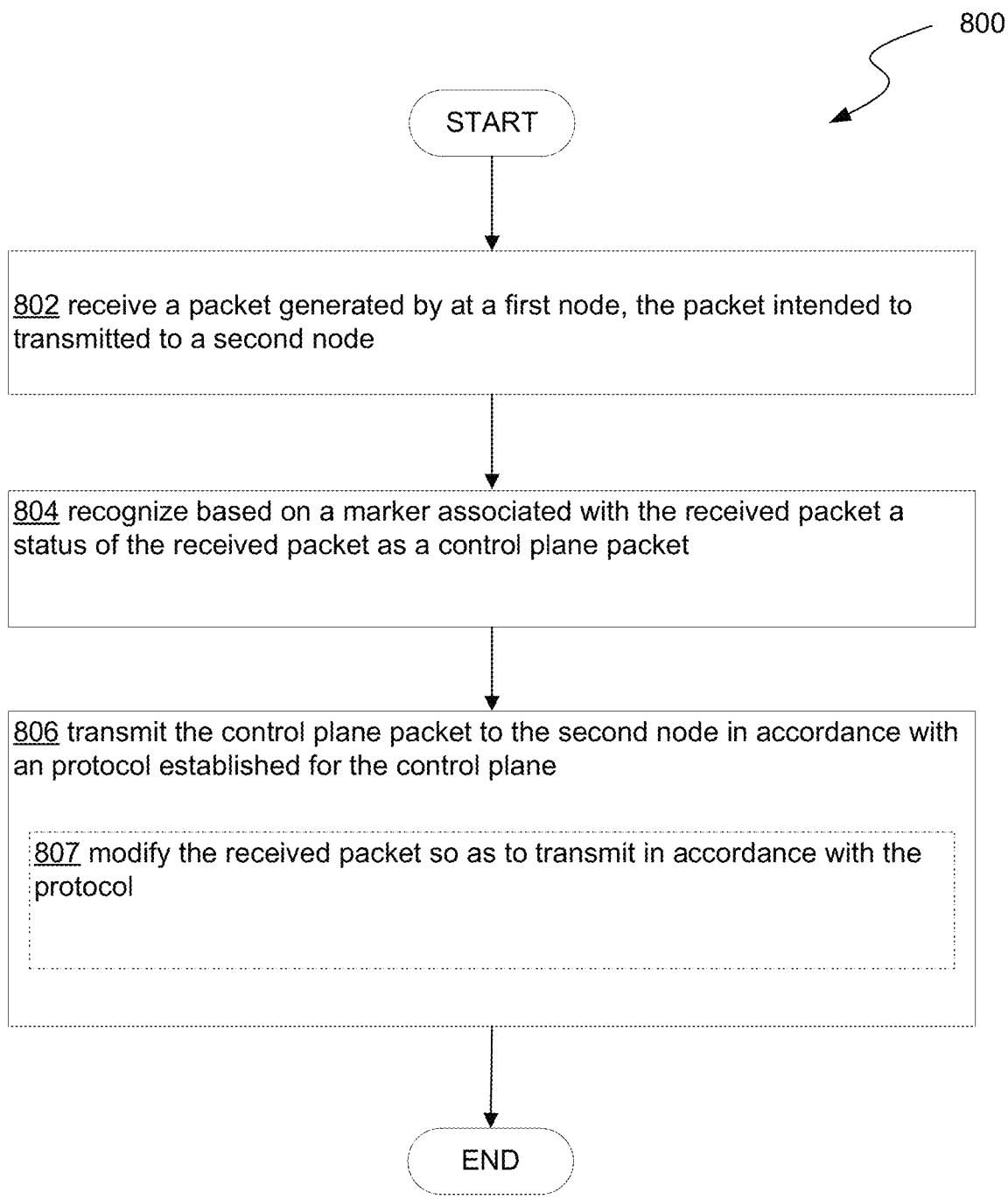
FIG. 8 shows a flow diagram of an example process for transmitting control plane packets over a robust control plane.

FIG. 8 is a flow chart of an example process 800 transmitting a control plane packet according to a protocol established for the control plane. As shown in FIG. 8, example process 800 begins at step 802 with receiving a packet generated at a first node that is intended to be transmitted to a second node of a multi-band-wireless networking system. In an example embodiment, the packet is generated by a software entity (e.g., a management application) at the first node and is received at step 802 by a processor at the first node. As previously discussed, the received packet may include some type of payload data to be transmitted (e.g., part of a message) as well as a marker indicative of a status of the generated packet as a control plane packet.

At step 804, the received packet is recognized as a control plane packet based on the marker associated with the packet. Again, the marker, may include an appended or modified header (e.g., PHY header, MAC header, TX header, etc.) or may be included in the payload.

At step 806, in response to recognizing the received packet as a control plane packet, the packet may be transmitted to the second node in accordance with the protocol established for the control plane. For example, the control plane packet may be transmitted at any one or more of a robust data rate, over multiple backhauls, using hybrid ARQ, over a dedicated control channel, using a robust transport protocol, etc. These established protocols for robust transfer of control plane data are described in more detail later in the disclosure. In some embodiments, step 806 may include causing by the processor the control plane packet to be transmitted by a chipset such as Wi-Fi module according to operating parameters that inform the radio what to do with the packet. In some embodiments, step 806 may include at sub-step 807, modifying (e.g., by the processor) the received control plane packet to transmit the packet in accordance with the protocol established for the control plane. In some embodiments, this modification may include further appending or modifying a header associated with the packet or modifying the payload of the packet.

One or more steps of the example process 800 may be performed by any one or more of the components of the example processing systems described with respect to FIG. 1 or 12. For example, the process depicted in FIG. 8 may be represented in instructions stored in memory that are then executed by a processing unit. The process 800 described with respect to FIG. 8 is an example provided for illustrative purposes and is not to be construed as limiting. Other processes may include more or fewer steps than depicted while remaining within the scope of the present disclosure. Further, the steps depicted in example process 800 may be performed in a different order than is shown.

Depending on the implementation, a robust control plane may, in some embodiments, utilize protocols built into lower level components for the transmission of control plane packets in a robust manner. For example, Wi-Fi hardware generally includes protocols for transmitting Wi-Fi beacons that provide a relative guarantee of delivery of the beacon. In other words, a Wi-Fi module may include hardware and/or drivers that may already be configured to transmit Wi-Fi beacons in a robust manner. Accordingly, control plane packets may be composed (e.g., by a management application) to mimic a Wi-Fi beacon to enable prioritized transmission. For example, a management application at a first node may append the content of a Wi-Fi beacon to the generated control plane packet for transport with guaranteed delivery to a second node. Note that in this example, the marker indicative of the status of the packet as a control plane packet may include, at least in part, the appended Wi-Fi beacon content. Some other maker may still be needed so that the control plane packet transmitted as a "fake" beacon is recognized as a control plane packet and not another Wi-Fi beacon upon receipt at the second node.

3.1 Robust Data Rates

A robust control plane may establish protocols that govern the rate at which control communication data is transferred. More specifically, control plane data generated at higher levels (e.g., in software at an application layer) may be marked to be transmitted at a particular data rate even though the data rates are actually managed at lower levels (e.g., network interface layer). In a robust control plane, robust data rates may be used that minimize packet loss. For example, a 10% packet error rate may be sufficient for file transfer but may lead to issues when communicating control data between nodes in a multi-band wireless network. Instead, depending on the implementation, a lower packet error rate (e.g., below 10%) may be necessary for effective control plane communications. For example, a particular embodiment may require a packet error rate as low as 0.1% to enable effective network management. Lower data rates may result in a lower packet error rate although this can depend on a number of other factors as well. Data rates may be expressed in a number of different ways such as bits per second and/or bits per symbol in the case of certain signal modulation techniques. For example, in the case of Quadrature Amplitude Modulation (QAM), the transmission of control plane data may be set at 16 QAM (i.e., four bits per symbol) to achieve robust transmission results.

Figure 9:
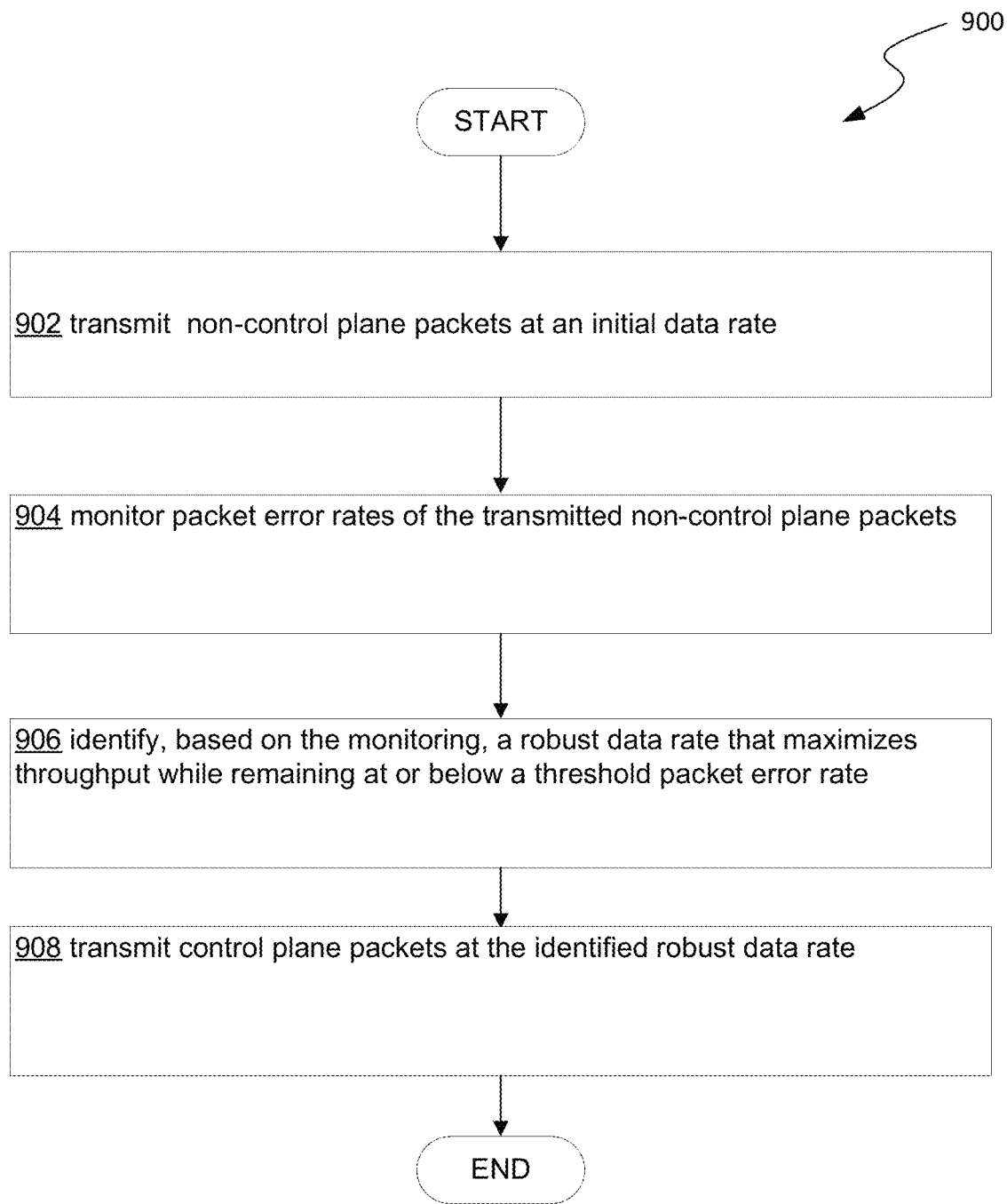
FIG. 9 shows a flow diagram of an example process for controlling data rates in a robust control plane.

In some embodiments, a rate control can be implemented for control communications over a control plane. In other words, the data rate may be controlled to satisfy a specified criterion. In certain embodiments, a criterion based on packet error rate may be used, although criteria based on other metrics (e.g., bit error rate, expected transmission count, latency, etc.) may also be used. In an example embodiment, the data rate for control plane communications may be throttled to satisfy a specified criterion (e.g., at a or below a threshold packet error rate). In some situations, higher data rates may be tested on non-control plane packets first. If a specified criterion is satisfied using such higher data rates on non-critical non-control plane packets, the data rates may be utilized for control plane communications. If the higher data rates do not result in robust data transfer, the data rates may be dynamically lowered until the criteria is satisfied. FIG. 9 shows an example rate control process 900 for transmitting control plane data. As shown in FIG. 9, example process 900 begins at step 902 with transmitting one or more non-control plane packets (e.g., standard backhaul traffic) at one or more initial data rates. The example process 900 continues at step 904 with monitoring packet error rates (or some other metric) for those transmitted non-control plane packets. The example process 900 continues at step 906 with identifying, based on the monitoring, a robust data rate that, for example, maximizes throughput (or some other performance metric) while remaining at or below a threshold packet error rate (or some other metric).

Finally, at step 908 the control plane packets are transmitted using the robust data rate identified at step 906. In some embodiments, the data rates may be capped for control plane communications despite observed success at higher rates to maintain sustainable robust communications. For example, data rates for control communications may be capped at 16 QAM or 64 QAM modulation and/or may expressly exclude higher rates such as 256 QAM and 1024 QAM modulation.

3.2 Multiple Backhauls

A robust control plane may establish protocols that govern replicated transmission of control plane data to mitigate the effects of lost packets. For example, in some embodiments copies of the same control plane packet may be transmitted multiple times over different bands (e.g., 2.4 GHz, 5 GHz low band, 5 GHz high band, etc.). In some embodiments, control plane packets for certain types of control communications (e.g., topology updates) may be transmitted on one band, while control plane packets other types of control communications (e.g., distributed router notifications) may be transmitted on another band. Copies of control plane packets may be tried over multiple wireless communication channels (e.g., a 2.4 GHz and 5 GHz channel, two different 5 GHz channels, a 2.4 GHz channel and two 5 GHz channels, etc. Copies of control plane packets may also be transmitted over multiple type of wireless and/or wired communication links (e.g., Wi-Fi, Bluetooth, Mocha, Power Line Communication (PLC), etc.).

3.3 Hybrid ARQ

A robust control plane may include the incorporation of hybrid automatic repeat request (hybrid ARQ or HARQ) in the transmission of control communications. Hybrid ARQ generally refers to the combination of forward error correction (FEC) with automated repeat request (ARQ). Automated repeat request (also referred to as automated repeat query) uses acknowledgements by a receiving entity that a piece of data (e.g., a packet) transmitted by a transmitting entity has been successfully received. If the acknowledgement from the receiving entity is not received by the transmitting entity within a certain period of time, the transmitting entity retransmits the piece of data. In a hybrid ARQ scheme, the transmitting entity additionally encodes the piece of data with an FEC code. This FEC code is transmitted automatically to the receiving entity or at the request of the receiving entity. The FEC code is then used to correct, if possible, any errors in the piece of data introduced during the transmission process, while the ARQ process described above is used as a fall-back position if any introduced errors are not correctable. Note that implementation of hybrid ARQ in a wireless networking device that does not natively support this process may require modification to hardware level components.

Figure 10:
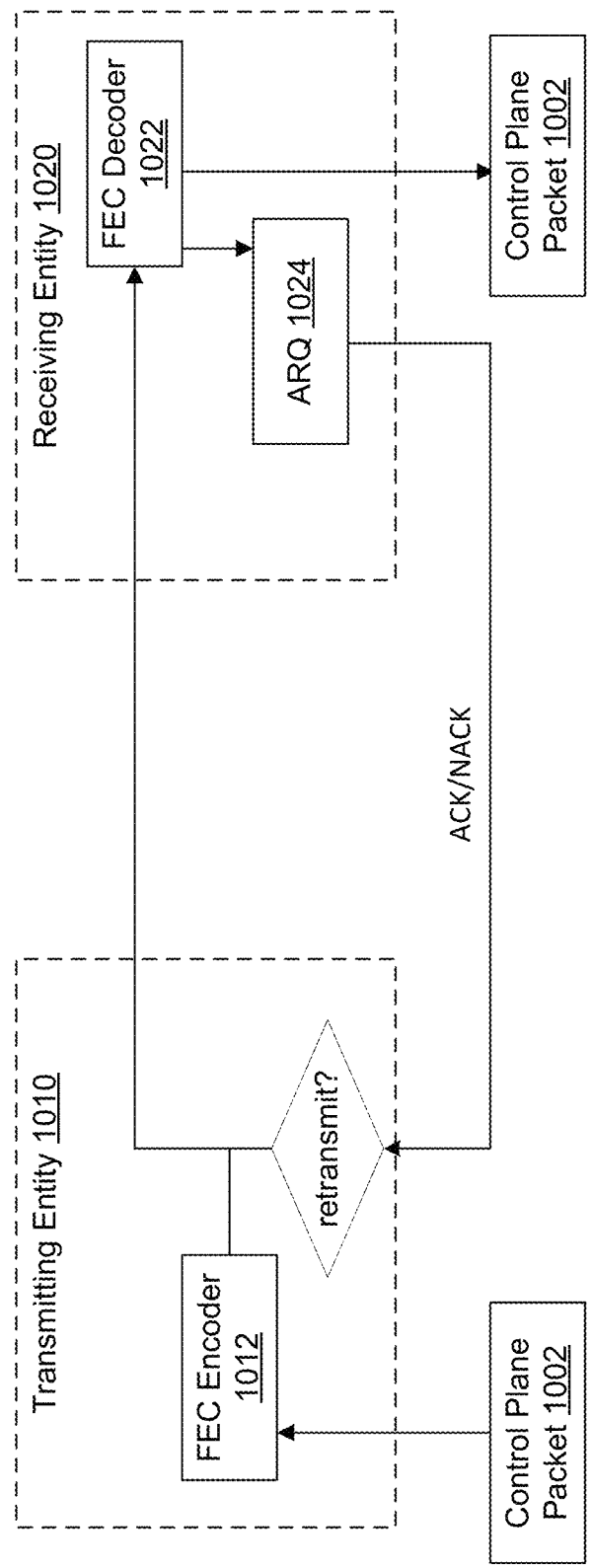
FIG. 10 shows an example schematic diagram illustrating the use of hybrid ARQ in a robust control plane.

FIG. 10 shows a diagram of an example transmission of a control plane packet using hybrid ARQ. As shown in FIG. 10, a control plane packet(s) 1002 is received by a transmitting entity 1010. In this example, the transmitting entity may comprise or include the hardware level network interface components at a transmitting node in a multi-band wireless network. As previously discussed, the control plane packet 1002 may be received from higher level software entity (e.g., in the application layer or convergent layer). An FEC encoder 1012 encodes the data in the received control plane packet(s) 1002 to generate an FEC code that is then transmitted by the transmitting entity 1010 along with the control plane packet(s) 1002 to a receiving entity 1020. Similar to the transmitting entity, the receiving entity 1020 may comprise or include the hardware level network interface components at a receiving node in a multi-band wireless network. Upon receipt at the receiving entity 1020, the FEC Decoder 1022 decodes the transmitted FEC code and an ARQ module 1024 transmits an acknowledgement (ACK) message to the transmitting entity 1010. If any detected transmission errors are not correctable though decoding of the FEC code, the ARQ module 1024 will transmit a non-acknowledgement (NACK) message to the transmitting entity 1010 which then determines, based on the received NACK message, if the control plane packet(s) 1002 should be retransmitted in whole or at least in part. For example, the NACK message may state that most of the data in the transmitted control plane packet(s) 1002 were received without issue, but that there are a few corrupted bits. The transmitting entity 1010 may thereby elect to encode and re-transmit the corrupted bits.

3.4 Robust Radio Dedicated for Backhaul

A robust control plane may establish protocols that utilize a dedicated channel (i.e., outside of the standard backhaul) for some or all control plane communications. In other words, nodes in a multi-band wireless networking system may include additional radios that operate in frequencies outside of those used for fronthaul communications (e.g., 2.4 GHz and or 5 GHz low band) and standard backhaul communications (e.g., 5 GHz high band). For example, with reference to FIG. 1, a node 100 may include one or more sub-1 GHz radios 108 dedicated for transmitting and receiving control plane communications. More specifically, the one or more sub-1 GHz radios 108 may operate at frequencies between 433 MHz through 928 MHz. Within this range are two regulated industrial, scientific, and medical (ISM) bands. These two bands are casually referred to as the 433 MHz band and the 900 MHz band. These bands actually range between 433.05 MHz-434.79 MHz and 902 MHz-928 Mhz. This frequency range typically has significantly less use than the 2.4 GHz band or the 5 GHz band since fewer devices operate in the 433-928 MHz range. One reason for the comparative non-use is that the 433-928 MHz frequency range carries less information (i.e., lower data rate) due to the significantly longer wavelengths (more time passes for the electromagnetic radiation to cycle through the period of each wavelength of data). However, the other result of the greater wavelength is that communications have much longer ranges than bands used in other radios at the same power (often reaching over a mile). In the context of control plane communications which generally involve little data but require higher reliability, the tradeoffs are beneficial.

In some embodiments, a dedicated control channel (e.g., in the 433-928 MHz range) may be used for all control plane communications between nodes in a multi-band wireless networking system. Alternatively, in some embodiments use of a dedicated control channel may be limited to a particular subset of control plane communications. For example, use of a dedicated control channel may be limited to the transfer of control plane communications deemed critical in some respect. Critical communications may include those communications that enable consensus between nodes in the multi-band wireless networking system and thereby allow the system to operate effectively. Although different implementations may set different standards, critical control communications may include, for example, timing synchronization, roaming coordination, provisioning of new nodes as APs, etc. Where control plane communications are prioritized as critical and non-critical, control plane packet (e.g., generated by a management application at a given node) may further include a marker indicative of a priority status (e.g., critical/non-critical) in addition to a marker indicative of a status as a control plane packet.

3.5 Transport Protocols for Control Communications

A robust control plane may establish the use of transport protocols configured for low latency and guaranteed delivery. Data transmission at the transport layer typically employs one of two types of transport protocols: the Transmission Control Protocol (TCP) or the User Datagram Protocol (UDP). UDP, typically used in applications such as voice over IP, typically results in lower latency, but has no guarantee of delivery. In other words, lost packets may be simply ignored so as not to delay the overall transmission. As previously discussed, the loss of packets in critical control communications may impact the effective operation of a multi-band wireless networking system. TCP, on the other hand, guarantees delivery, but introduces latency. Again, such latency, in the context of control communications, may impact the effective operation of a multi-band wireless networking system.

Instead, in some embodiments, alternative transport protocols may be used for transmitting control plane data. For example, some embodiments may utilize a real-time transport protocol (RTP) such as the RTP Control Protocol (RTCP). RTCP is typically used for video control transport but is designed for low latency with guarantee of delivery. For example, in a streaming video application, certain control communications (e.g., to pause the video) may require guarantee of delivery. Similarly, control plane communications used to communicate control messages between nodes in a multi-band wireless networking system may be transmitted using some variation on RTCP or a proprietary transport protocol configured around similar goals (i.e., low latency, guarantee of delivery).

In some embodiments, Message Queuing Telemetry Transport (MQTT) may also be used as a protocol to send control plane data. MQTT is a lightweight messaging protocol designed for unreliable networks and as result helps to send packets over wireless backhaul which have packet loss. The design principles for MQTT effectively minimize network bandwidth usage while attempting to increase reliability and of assurance of delivery. MQTT includes the three levels of Quality of Service. QoS 0 ensures delivery at most once. QoS 1 ensures delivery at least once. QoS 2 ensures delivery exactly once. QoS 1 and QoS 2 may be used for management frames, however the level of QoS utilized when implementing MQTT as a transport protocol will depend on requirements of the network. QoS 1 ensures that a message arrives at the receiver at least once. Under QoS 1, the receiver may also receive the same message multiple times and therefore may need to implement logic to handle duplicate messages (e.g., using sequence numbers or time stamps). QoS 0 does not guarantee delivery of messages and so QoS 0 may not be good option for robust control. QoS 2 delivers the highest quality of service without loss and without duplication of messages, but has an increased overhead which slows down transfer and so may not be work for control messages in some situations.

In some embodiments, WebSocket may also be used as a protocol to send control plane data. WebSocket is a protocol providing full-duplex communication channels over a single TCP connection. TCP adds delay in the presence of packet loss and is therefore not ideal for low latency, however TCP works is reliable for communicating messages. WebSocket may be used as a secondary robust way to send updates that are also sent using a lower latency but less reliable protocol. WebSocket enables interaction between a web client (e.g., a browser) and a web server with lower overhead thereby facilitating real-time data transfer with the server. Websocket provides a standardized way for a server to send content to a client without first receiving a request from by the client. WebSocket also allows messages to be passed back and forth while keeping the connection open. Such features of Websocket can assist in sending control packets between two different APs without one of the APs requesting an update from the other AP.

4.0 Distributed Router Functionality

As previously discussed, in certain embodiments, a single node of a multi-band wireless networking system provides router functionality for the system. In such embodiments, this router node relies on up-to-date information from the multiple satellite nodes. Delays in receiving this information can result in interrupted service to client devices. To avoid such delays, certain router functions can instead be distributed among the multiple nodes of a multi-band wireless networking system.

Figure 11A:
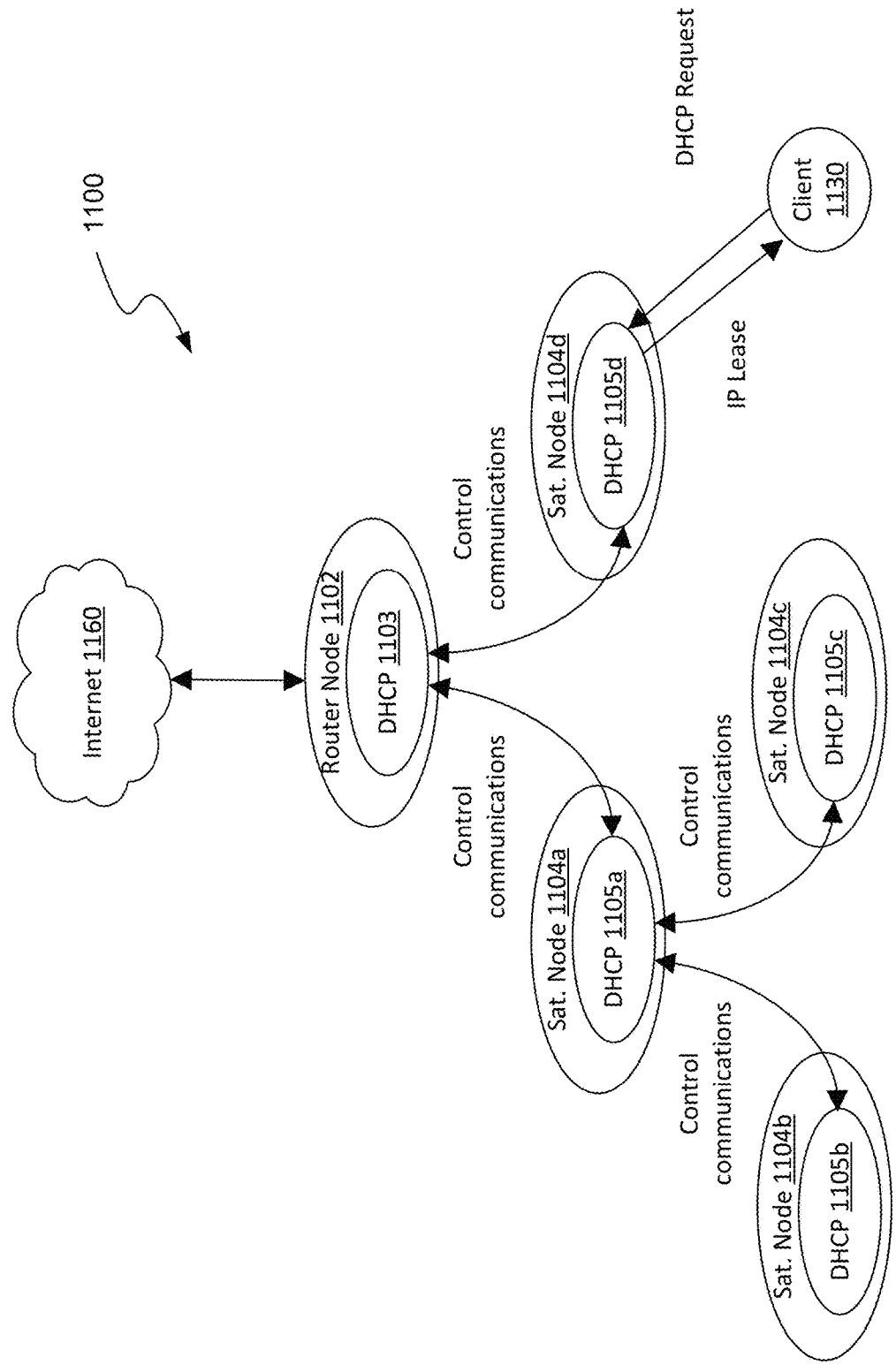
FIG. 11A shows a diagram of an example multi-band wireless networking system with distributed Dynamic Host Configuration Protocol (DHCP) functionality.

FIG. 11A shows an example wireless networking system 1100 that includes distributed dynamic host configuration protocol (DHCP) functionality. As shown in FIG. 11, the example system 1100 includes a router node 1102 and multiple satellite nodes 1104a-d that collectively provide broad wireless coverage to a client device 1130. As previously discussed, the base router node 1102 in this example provides the connection to the Internet 1160.

In a non-distributed implementation, the allocation of IP addresses to connecting client devices would be handled by a centralized DHCP server operating at the router node 1102. A client device attempting to connect to one of the satellite nodes 1104a-c would request an IP address assignment which would then need to be communicated to the centralized DHCP server operating at the router node 1102. In other words, a successful connection of the client device 1130 to the wireless network would rely on the communication of the request to the router node 1102, the successful assignment by the centralized DHCP server at the router node 1102, and communication of that assignment back to the satellite node to which the client 1130 was connected.

Instead of operating strictly at the router node 1102, DHCP functionality can be distributed across multiple nodes in a given system. For example, as shown in FIG. 11, the DHCP server is distributed across the router node 1102 and the multiple satellite nodes 1104a-d. Specifically, a distributed router agent in the form of a DHCP agent 1103 operates at router node 1102 with DHCP agents 1105a-d operating at satellite nodes 1104a-d (respectively). As will be described in more detail, control communications between the multiple nodes are used to coordinate the various DHCP agents of the distributed DHCP server to dynamically assign IP addresses and maintain knowledge of these assignments during client roaming. In some embodiments, the control communications over which this coordination is performed are part of a robust control plane described in more detail above.

Figure 11B:
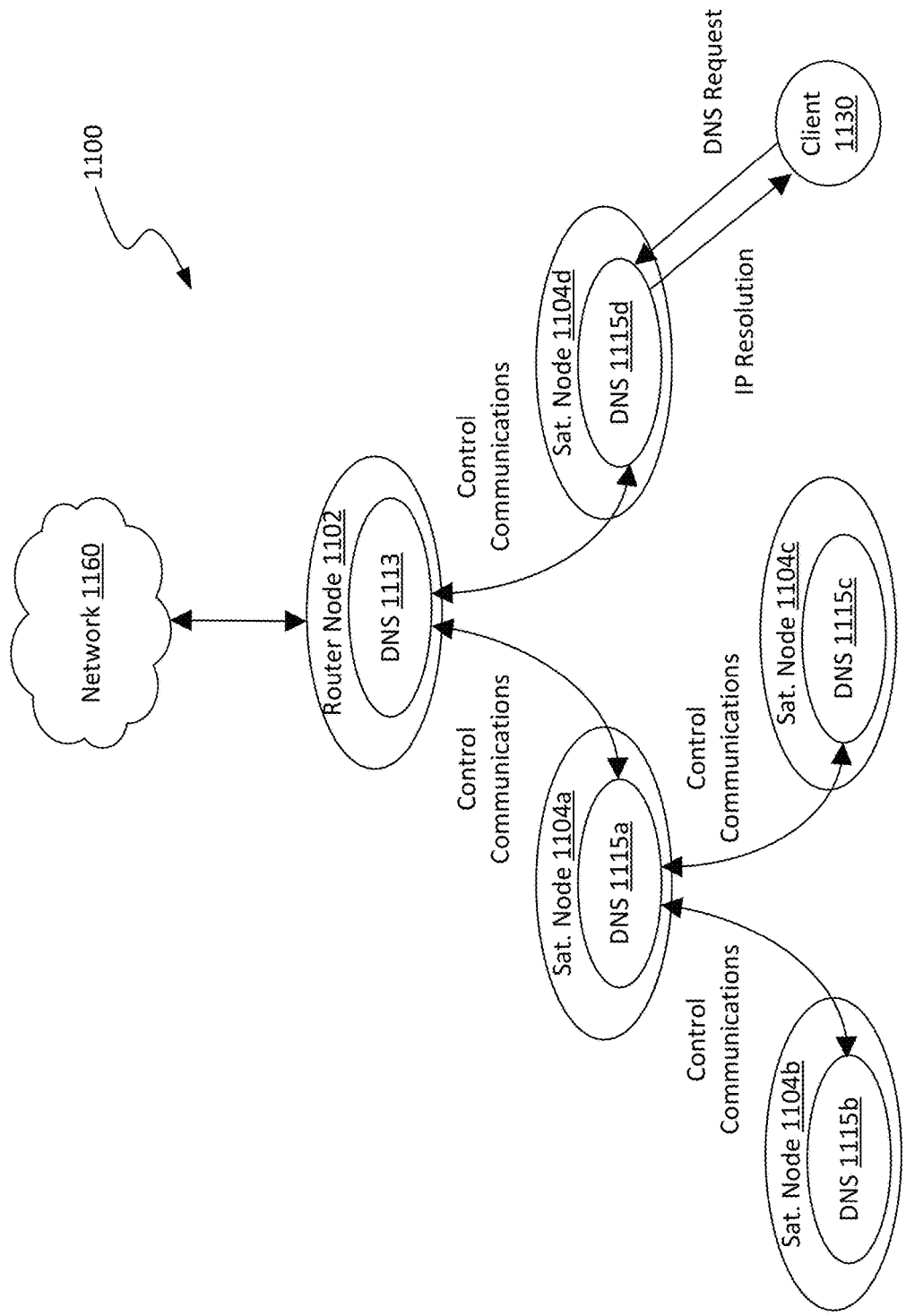
FIG. 11B shows a diagram of an example multi-band wireless networking system with distributed Domain Name Server (DNS) functionality.

Other router functionalities may be distributed across multiple nodes as well. For example, domain name server (DNS) functionality can be distributed in a similar manner as DHCP functionality. FIG. 11B shows another embodiment of the network system 1100 of FIG. 11A, in which a DNS server is distributed across multiple nodes. Specifically, as shown in FIG. 11B, a DNS agent 1113 operates at router node 1102 with DNS agents 1115a-d operating at satellite nodes 1104a-d (respectively).

Figure 11C:
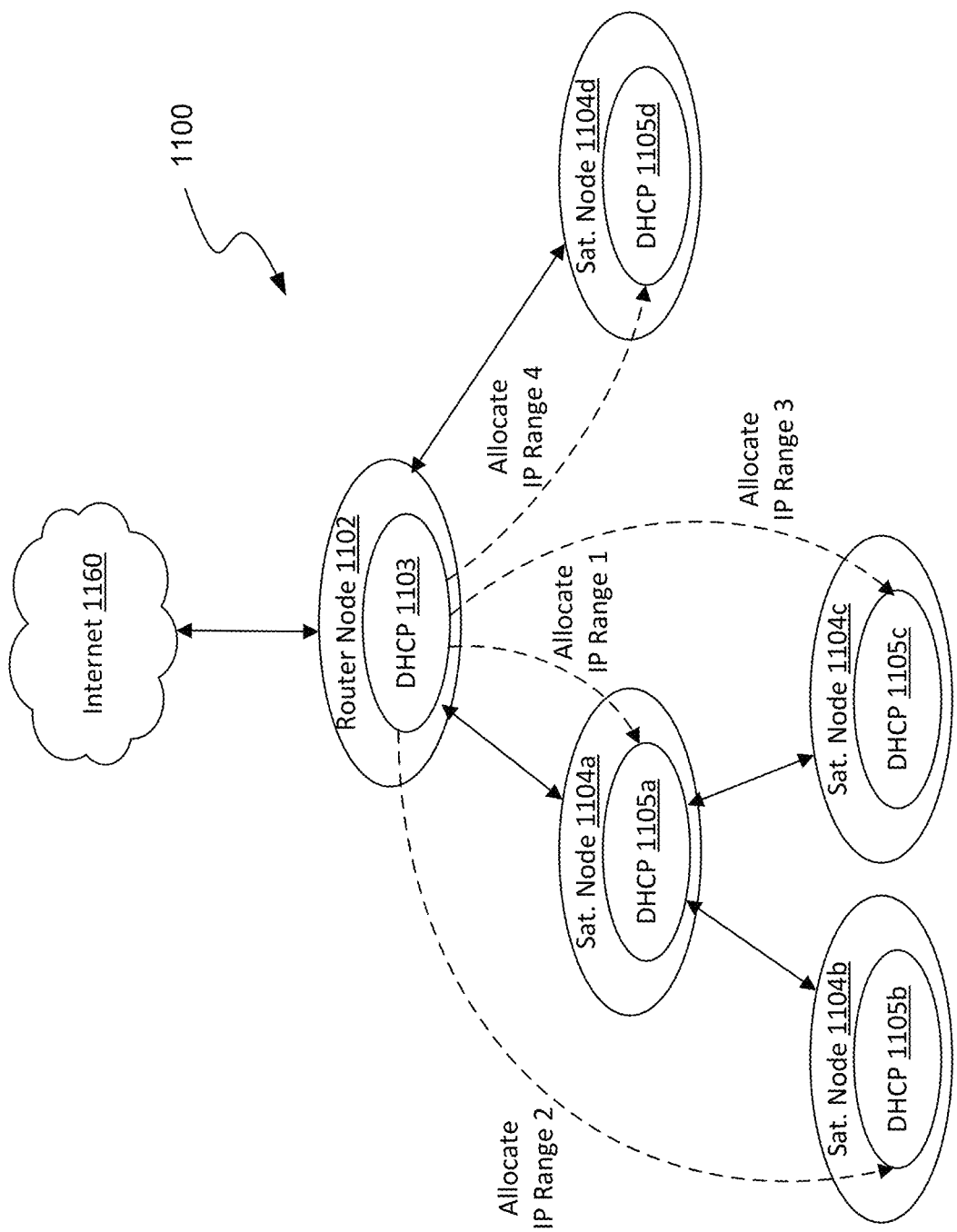
FIG. 11C shows a diagram of the system of FIG. 11A illustrating an example process for allocating ranges of IP addresses to DHCP agents at satellite nodes.

FIG. 11C is a diagram of the example system 1100 illustrating an example process for allocating IP address ranges in a wireless networking system with distributed DHCP functionality. In an embodiment, the DHCP agent 1103 at the router node 1102 initially allocates a range of IP addresses to each of a plurality of distributed DHCP agents 1105a-d at satellite nodes 1104a-d (respectively). This allocation may be performed using control communications, for example, transmitted over a robust control plane, as previously described. For example, as shown in FIG. 11C, DHCP 1103 has allocated a first range of assignable IP addresses to DHCP agent 105a, a second range to DHCP agent 1105b, a third range to DHCP agent 1105c, and a fourth range to DHCP agent 1105d. The ranges distributed to each node may include an equal number of IP addresses split among the number of nodes in the system. Alternatively, the allocation of IP ranges may differ from node to node and be based on any number of factors such as historical needs, type of node, traffic conditions, etc. In some embodiments, the allocated ranges at a given node may remain allocated until assigned or released by the DHCP agent at that node or may be dynamically de-allocated by DHCP 1103, for example to respond to request for additional allocations from DHCP agents at other nodes.

Figure 11D:
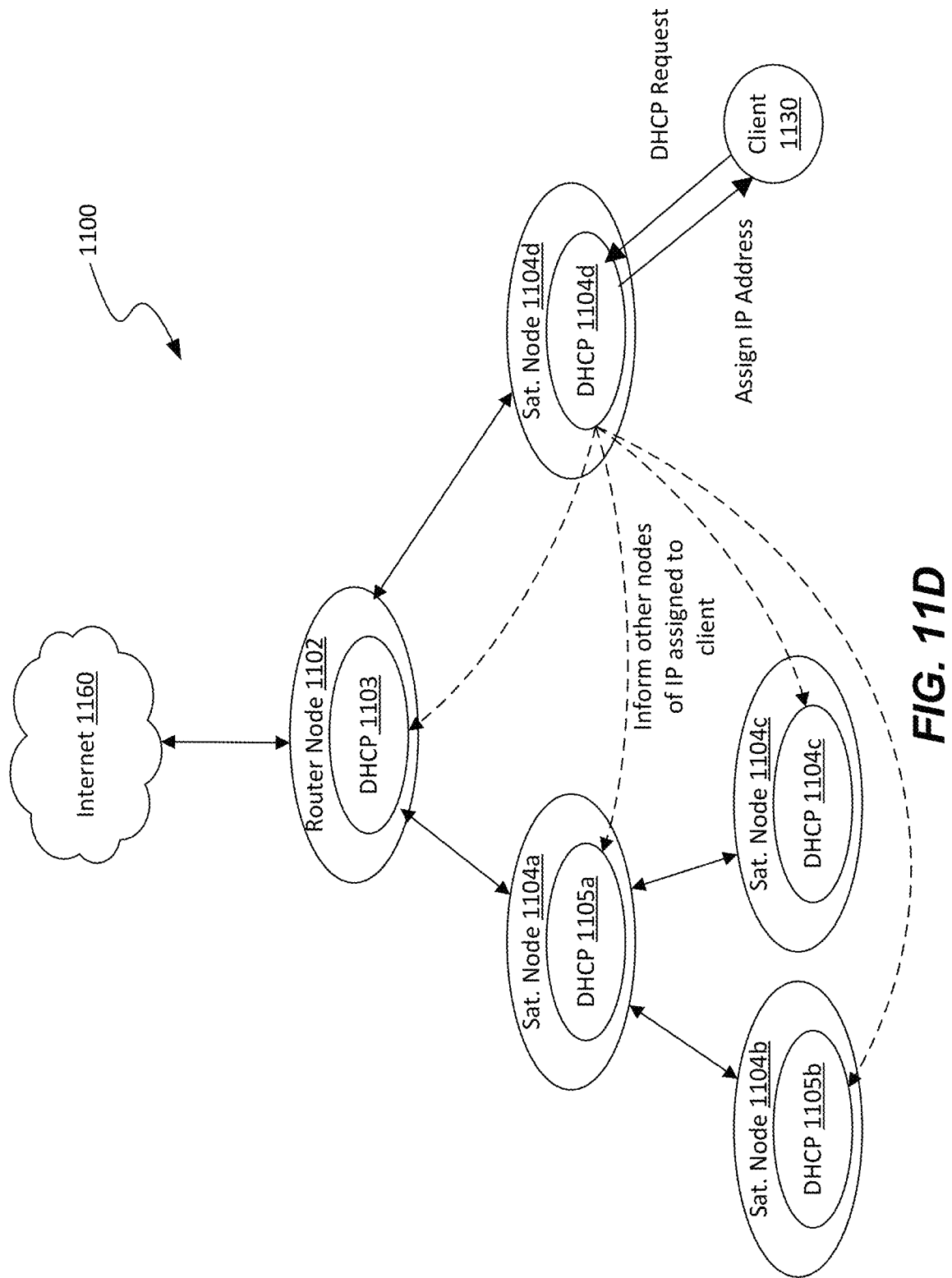
FIG. 11D shows a diagram of the system of FIG. 11A illustrating an example process for assigning an IP address to a client device.

In some embodiments, the DHCP allocations and individual assignments may tracked in one or more tables stored at and synchronized among the multiple nodes 1102 and 1104a-d. For example, each satellite node may be informed not only of the range of IP addresses that it has been allocated, but of the IP range allocations for all the other nodes in the network. Further, as will be described with respect to FIG. 11D, each of the nodes may similarly be informed of individual IP assignments to connected devices FIG. 11D is a diagram of the example system 1100 illustrating an example process for assigning an IP address to a joining client device in a wireless networking system with distributed DHCP functionality. The scenario depicted in FIG. 11D assumes that IP address ranges were previously allocated, by DHCP agent 1103 at router node 1102, to each of the DHCP agents 1105a-d at satellite nodes 1104a-d (respectively), for example, as described with respect to FIG. 11C. As shown in FIG. 11D, a client device 1130 attempting to join the network 1100 submits a DHCP request to a DHCP agent at one of the satellite nodes, in this case, DHCP agent 1104d at satellite node 1104d. In response to the request, the DHCP agent 1104d at satellite node 1104d assigns a free IP address including its allocated IP address range to the client device 1130. After assigning an IP address to the client device 1130, the DHCP agent 1104d then transmits a notification to one or more of the other DHCP agents forming the distributed DHCP server informing them of the IP address assignment to client device 1130. Such notification may be performed using control communications, for example, transmitted over a robust control plane, as previously described. In some embodiments, information regarding the IP address assignment (e.g., the IP address, identifiers associated with the client device 130, time stamp information, etc.) may then be stored in the aforementioned one or more tables maintained by each of the DHCP agents 1103 and 1105a-d.

Figure 11E:
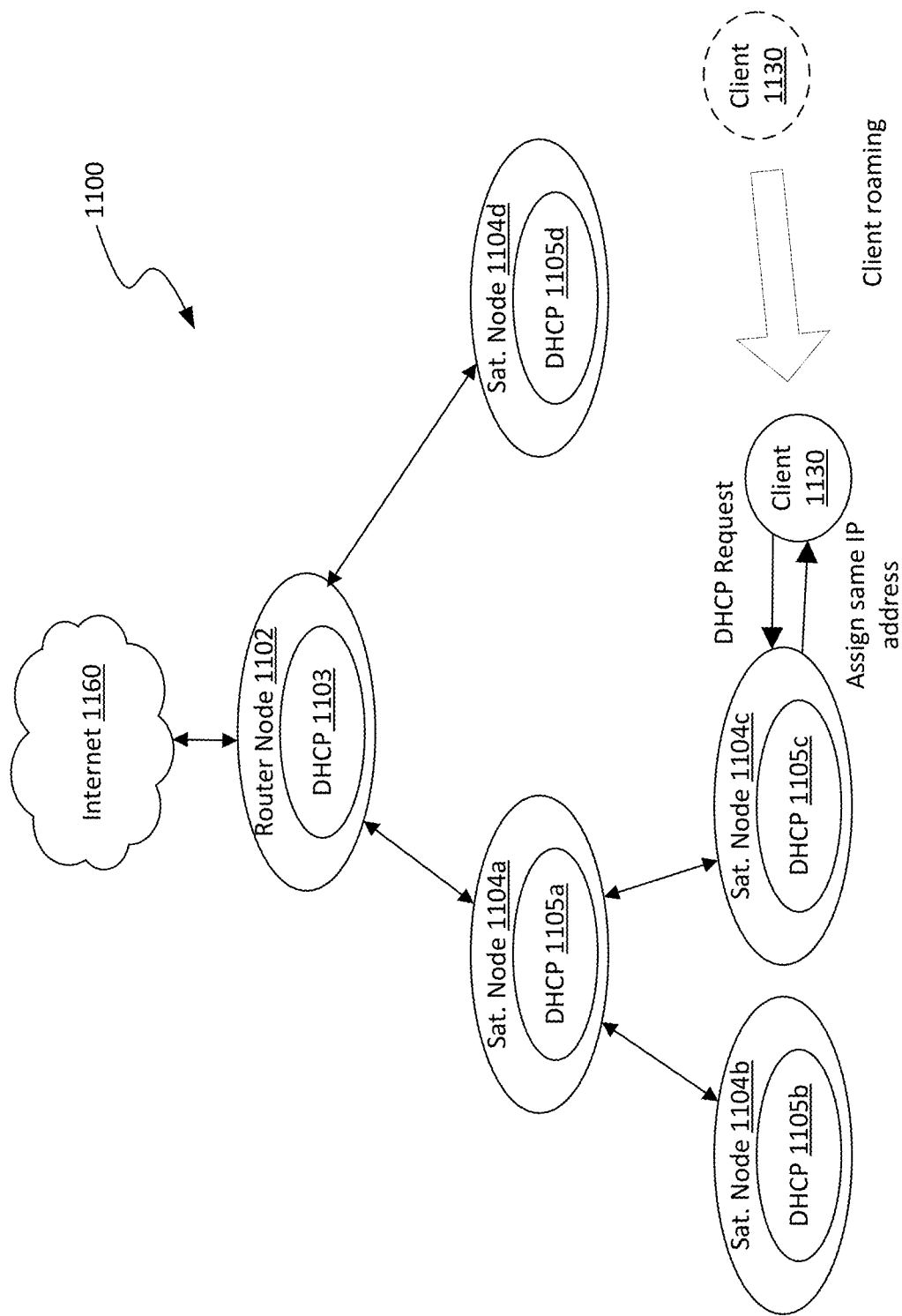
FIG. 11E shows a diagram of the system of FIG. 11A illustrating an example process for assigning an IP address to a roaming client device.

FIG. 11E is a diagram of the example system 1100 illustrating an example process for retaining assignment of an IP address for a client device roaming through a wireless networking system with distributed DHCP functionality. The scenario depicted in FIG. 11E assumes that IP address ranges were previously allocated, by DHCP agent 1103 at router node 1102, to each of the DHCP agents 1105a-d at satellite nodes 1104a-d (respectively), for example, as described with respect to FIG. 11C. The scenario depicted in FIG. 11D further assumes that the DHCP agent 1105d of satellite node 1104d previously assigned an IP address to client device 1130d, for example, as described with respect to FIG. X4. As shown in FIG. 11E, client device 1130 is handed off from satellite node 1104d to satellite node 1104c in response to roaming by client device 1130. As previously mentioned with respect to FIG. 11D, the DHCP module 1105d previously informed the other DHCP agents of the IP address assigned to client device 130. Accordingly, DHCP agent 1105c has knowledge of the assignment of a particular IP address to client device 1130. Accordingly, in response to a DHCP request from client device 1130 upon connection, the DHCP agent 105c may access a table with data associating the previously assigned IP address to client device 1130. For example, the IP address may be associated with some type of identifier associated with the client device 1130 (e.g., a MAC address, UUID, account username, etc.). By accessing the table, the DHCP agent 1105c identifies the IP address matching any identifying information associated with the client device 1130 and proceeds to assign that same IP address to the client device 1130.

Although not shown in FIG. 11E, after reassigning the same IP address to client device 1130, the DHCP agent 1105c may transmit a notification to one or more of the other DHCP agents forming the distributed DHCP server informing them of the IP address reassignment to client device 1130 as well as the hand-off from satellite node 1104d to satellite node 1104c. Again, such notification may be performed using control communications, for example, transmitted over a robust control plane, as previously described.

Figure 11F:
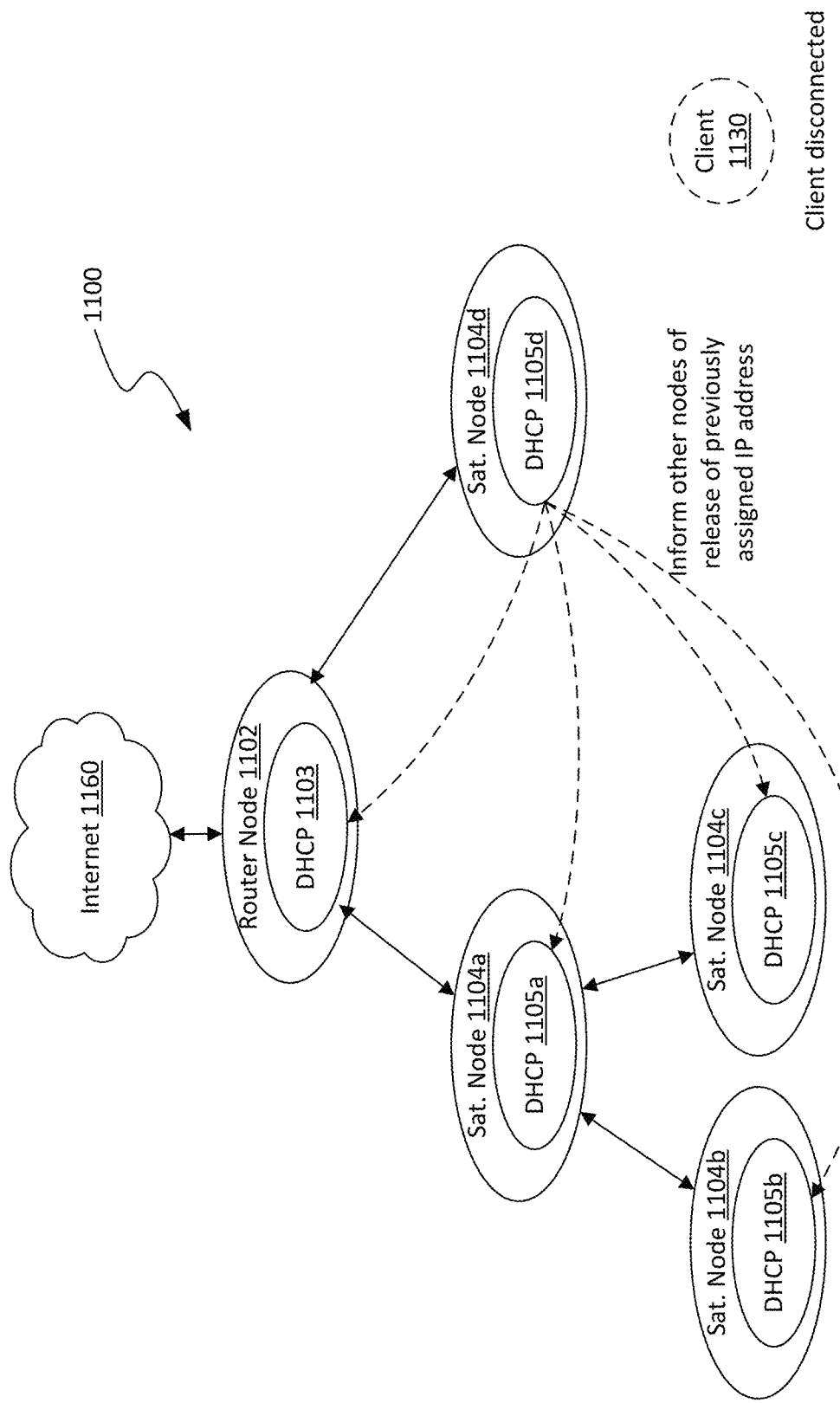
FIG. 11F shows a diagram of the system of FIG. 11A illustrating an example process for releasing a previously assigned IP address after a client device has disconnected.

FIG. 11F is a diagram illustrating an example process for disconnecting a client device from a wireless networking system with distributed DHCP functionality. The scenario depicted in FIG. 11F assumes that IP address ranges were previously allocated, by DHCP agent 1103 at router node 1102, to each of the DHCP agents 1105a-d at satellite nodes 1104a-d (respectively), for example, as described with respect to FIG. 11C. The scenario depicted in FIG. 11D further assumes that the DHCP agent 1105d of satellite node 1104d previously assigned an IP address to client device 1130d, for example, as described with respect to FIG. 11D. As shown in FIG. 11F, in response to the client device 1130 disconnecting from the wireless networking system 1100, the DHCP agent 1105d of satellite node 1104d transmits a notification to one or more of the other DHCP agents forming the distributed DHCP server informing them that the previously IP address previously assigned to client device 1130 has been released. Such notification may be performed using control communications, for example, transmitted over a robust control plane, as previously described. In response to receiving the notification from DHCP agent 1105d at satellite node 1104d, the other DHCP modules may store information associated with the notification in one or more tables that are synchronized across the distributed DHCP server.

In some embodiments, the now released IP address would remain allocated to DHCP agent 1105d of satellite node 1104d to be assigned at a later time to another client device. In other embodiments, the now released IP address may be revert to the DHCP agent 1103 of the router node 1102 to be allocated to a DHCP module of another satellite node.

Example Computer Implementation

FIG. 12 is a block diagram illustrating an example of a processing system 1200 in which at least some operations described in this disclosure can be implemented. The processing system 1200 may include one or more central processing units ("processors") 1202, main memory 1206, non-volatile memory 1210, network adapter 1212 (e.g., network interfaces), display 1218, input/output devices 1220, control device 1222 (e.g., keyboard and pointing devices), drive unit 1224 including a storage medium 1226, and signal generation device 1230 that are communicatively connected to a bus 1216. The bus 1216 is illustrated as an abstraction that represents any one or more separate physical buses, point to point connections, or both connected by appropriate bridges, adapters, or controllers. The bus 1216, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In various embodiments, the processing system 1200 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 1206, non-volatile memory 1210, and storage medium 1226 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1228. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 1204, 1208, 1228) set at various times in various memory and storage devices in a computer, and that, when read and executed by one or more processing units or processors 1202, cause the processing system 1200 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1610, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1212 enables the processing system 1200 to mediate data in a network 1214 with an entity that is external to the processing system 1200, such as a network appliance, through any known and/or convenient communications protocol supported by the processing system 1200 and the external entity. The network adapter 1212 can include one or more of a network adaptor card, a wireless network interface card, a router, an AP, a wireless router, a switch, a multilayer switch, a protocol converter, a gateway, a bridge, bridge router, a hub, a digital media receiver, and/or a repeater.

The network adapter 1212 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    wirelessly interconnecting a plurality of wireless networking devices via a wireless backhaul that is dedicated for communication between the plurality of wireless networking devices, said plurality of wireless networking devices collectively forming a single multi-band wireless network providing broad coverage to a client device;
    establishing a control plane for managing the multi-band wireless network, the control plane implemented by a software entity establishing a protocol for wirelessly communicating control plane data; and
    managing the multi-band wireless network by wirelessly communicating control plane data among the plurality of wireless networking devices in accordance with the established protocol;
    wherein communicating control plane data includes:
        generating, by an instance of the software entity a first wireless networking device of the plurality of wireless networking devices, a control plane packet for transmission to a second wireless networking device of the plurality of wireless networking devices, the control plane packet including:
            payload data to be transmitted to the second wireless networking device; and
            a marker indicative of a status as a control plane packet; and
    wherein communicating control plane data further includes:
        receiving, by a processing unit of the first wireless networking device, a packet;
        recognizing, by the processing unit, the received packet as the control plane packet based on the marker; and
        causing, by the processing unit, the transmission of the control plane packet in accordance with the established protocol.

2. The method of claim 1, wherein communicating control plane data among the plurality of wireless networking devices in accordance with the established protocol includes:
    prioritizing transmission of control plane packets over transmission of non-control plane packets.

3. The method of claim 2, wherein prioritizing transmission of control plane packets includes:
    marking control plane packets as belonging to a standard wireless multimedia (WMM) prioritized access category.

4. The method of claim 1, wherein the established protocol is based on a combination of a layer 2 protocol and an application layer protocol.

5. The method of claim 4, wherein generation of the control plane packets is according to the application layer protocol, and wherein transmission of the generated control plane packets is according to the layer 2 protocol.

6. The method of claim 1, wherein the established protocol conforms with IEEE 1905.1.

7. The method of claim 1, wherein the protocol established by the software entity is configured to wirelessly communicate control plane data in a robust manner that guarantees delivery while minimizing latency.

8. The method of claim 1, wherein the software entity runs above layer 2.

9. The method of claim 1, wherein the software entity runs in any of:
    an application layer; or
    a convergent layer.

10. The method of claim 1, wherein causing the transmission of the control plane packet includes first modifying, by the processing unit, the control plane packet so as to transmit in accordance with the established protocol.

11. The method of claim 1, wherein the marker is included in the packet as any of:
    a header appended to the control plane packet;
    a modification of an existing header of the control plane packet; or
    information in a payload of the control plane packet.

12. The method of claim 10, wherein the existing header is a media access control (MAC) header.

13. The method of claim 1, wherein communicating control plane data among the plurality of wireless networking devices includes:
   transmitting control plane packets at a data rate set by the established protocol, the data rate configured to achieve at or below a threshold packet error rate.

14. The method of claim 13, wherein the threshold packet error rate is 10%.

15. The method of claim 13, wherein the data rate is limited to any of 16 QAM or 64 QAM.

16. The method of claim 13, wherein the established protocol excludes data rates of 256 QAM or 1024 QAM.

17. The method of claim 13, wherein the data rate is dynamically modified according to the established protocol to maximize throughput while remaining at or below the threshold packet error rate.

18. The method of claim 1, wherein communicating control plane data among the plurality of wireless networking devices includes:
   transmitting a plurality of copies of a control plane packet over a plurality of backhauls interconnecting the plurality of wireless networking devices.

19. The method of claim 1, wherein communicating control plane data among the plurality of wireless networking devices includes:
   transmitting a plurality of copies of a control plane packet over a plurality of backhaul types.

20. The method of claim 1, wherein communicating control plane data among the plurality of wireless networking devices includes:
   transmitting a plurality of copies of a control plane packet over a plurality of communication channels in different bands.

21. The method of claim 1, wherein communicating control plane data among the plurality of wireless networking devices includes:
   transmitting control plane packets using hybrid automatic repeat request (ARQ).

22. The method of claim 1, wherein communicating control plane data among the plurality of wireless networking devices includes:
   transmitting control plane packets over a dedicated control channel.

23. The method of claim 22, wherein the dedicated control channel is in a band that is lower than a client band over which broad coverage is provided to the client device.

24. The method of claim 22, wherein the dedicated control channel is between 433 MHz and 928 MHz.

25. The method of claim 1, wherein the established protocol is a proprietary protocol configured for low latency and guaranteed delivery.

26. The method of claim 1, wherein the established protocol implements a transport protocol including any one or more of, a real-time transport control protocol (RTCP), a message queuing telemetry transport (MQTT) protocol, or a WebSocket protocol.

27. The method of claim 1, wherein the dedicated wireless backhaul is on the 5 GHz band.

28. The method of claim 1, wherein at least one of the plurality of wireless networking devices comprises:
   a 2.4 GHz radio;
   a 5 GHz low band radio; and
   a 5 GHz high band radio.

29. The method of claim 1, wherein the plurality of wireless networking devices include:
   a base device providing connectivity to an external network; and
   a plurality of satellite devices.

30. The method of claim 29, further comprising:
   establishing distributed router agents at the plurality of wireless networking devices including one or more of the satellite devices, the distributed router agents configured to perform router functionality for connected client devices without direct control by the base device; and
   managing the distribution of router functionality in the multi-band wireless network by wirelessly communicating notifications in the form of control plane data between the distributed router agents in accordance with the established protocol.

31. A method comprising:
   wirelessly interconnecting a plurality of wireless networking devices via a wireless backhaul that is dedicated for communication between the plurality of wireless networking devices, said plurality of wireless networking devices collectively forming a single multi-band wireless network providing broad coverage to a client device;
   establishing a control plane for managing the multi-band wireless network, the control plane implemented by a software entity establishing a protocol for wirelessly communicating control plane data; and
   managing the multi-band wireless network by wirelessly communicating control plane data among the plurality of wireless networking devices in accordance with the established protocol;
   wherein communicating control plane data among the plurality of wireless networking devices includes transmitting control plane packets at a data rate set by the established protocol, the data rate configured to achieve at or below a threshold packet error rate;
   wherein the data rate is dynamically modified according to the established protocol to maximize throughput while remaining at or below the threshold packet error rate; and
   wherein dynamically modifying the data rate includes:
      transmitting one or more non-control plane packets at one or more initial data rates;
      monitoring packet error rates of the transmitted one or more non-control plane packets; and
      identifying, based on the monitoring, a robust data rate, the robust data rate maximizing throughput while remaining at or below the threshold packet error rate.

32. A wireless networking device comprising:
   a first radio configured for communication with a plurality of other wireless networking devices via a dedicated wireless communication channel, the wireless networking device and the plurality of other wireless networking devices collectively forming a single multi-band wireless network providing broad coverage to a client device;
   a second radio configured for communication with the client device as part of the broad coverage by the multi-band wireless network;
   a processor; and
   a memory communicatively coupled to the processor, the memory including instructions stored thereon, which when executed by the processor cause the wireless networking device to:
      communicate with the plurality of other wireless networking devices over a control plane for managing the multi-band wireless network, the control plane establishing a protocol for wirelessly communicating control plane data;

wherein communicating with the plurality of other wireless networking devices over a control plane includes:
- generating, by an instance of the software entity at the wireless networking device, a packet for transmission to another wireless networking device of the plurality of wireless networking devices, the packet including:
  - payload data to be transmitted to the other wireless networking device; and
  - a marker indicative of a status as a control plane packet;
- receiving, by the processor, the generated packet;
- recognizing, by the processor, the received packet as a control plane packet based on the marker; and
- causing, by the processor, the transmission of the packet over the control plane in accordance with the established protocol.

33. The wireless networking device of claim 32, wherein communicating with the plurality of other wireless networking devices over the control plane includes:
transmitting control plane packets at a data rate set by the established protocol, the data rate configured to achieve at or below a threshold packet error rate.

34. The wireless networking device of claim 32, wherein:
the first radio operates in the 5 GHz high band; and
the second radio operates in any of the 2.4 GHz band or 5 GHz low band.

35. The wireless networking device of claim 32, further comprising:
a third radio dedicated for communication of control plane data with the plurality of other wireless networking devices over the control plane.

36. The wireless networking device of claim 35, wherein the third radio operates at a lower frequency than the first radio or second radio.

37. The wireless networking device of claim 35, wherein:
the first radio operates in the 5 GHz high band;
the second radio operates in any of the 2.4 GHz band or 5 GHz low band; and
the third radio operates between 433 MHz and 928 MHz.

* * * * *